(12) United States Patent
Casper et al.

(10) Patent No.: US 8,140,713 B2
(45) Date of Patent: *Mar. 20, 2012

(54) SYSTEM AND PROGRAM PRODUCTS FOR FACILITATING INPUT/OUTPUT PROCESSING BY USING TRANSPORT CONTROL WORDS TO REDUCE INPUT/OUTPUT COMMUNICATIONS

(75) Inventors: Daniel F. Casper, Poughkeepsie, NY (US); John R. Flanagan, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/946,514

(22) Filed: Nov. 15, 2010

(65) Prior Publication Data
US 2011/0060848 A1 Mar. 10, 2011

Related U.S. Application Data

(63) Continuation of application No. 12/392,246, filed on Feb. 25, 2009, now Pat. No. 7,840,719, which is a continuation of application No. 11/548,060, filed on Oct. 10, 2006, now Pat. No. 7,500,023.

(51) Int. Cl.
*G06F 3/00* (2006.01)
*G06F 13/00* (2006.01)

(52) U.S. Cl. .............................. 710/5; 710/35
(58) Field of Classification Search ........................ 710/5
See application file for complete search history.

(56) References Cited

U.S. PATENT DOCUMENTS

| | | |
|---|---|---|
| 3,693,161 A | 9/1972 | Price et al. |
| 3,943,283 A | 3/1976 | Caragliano et al. |
| 4,004,277 A | 1/1977 | Gavril |

(Continued)

FOREIGN PATENT DOCUMENTS

| | | |
|---|---|---|
| DE | 3931514 | 3/1990 |
| GB | 1264096 | 2/1972 |
| GB | 2291990 | 2/1996 |

(Continued)

OTHER PUBLICATIONS

Z/Architecture • Principles of Operation SA 22-7832-01 International Business Machines Corporation, 2nd Edition, Oct. 2001.

(Continued)

*Primary Examiner* — Henry Tsai
*Assistant Examiner* — John Roche
(74) *Attorney, Agent, or Firm* — Cantor Colburn LLP; John Campbell

(57) ABSTRACT

A computer program product, apparatus, and method for facilitating input/output processing of a processing environment are provided. The computer program product is provided for performing a method including: obtaining by an input/output communications adapter of the processing environment a transport control word including an address of a channel command word descriptor configured to contain a plurality of commands to be executed by the control unit; forwarding to the control unit the channel command word descriptor that includes one or more commands as one entity, wherein the forwarding includes forwarding from the input/output communications adapter to the control unit the channel command word descriptor including the one or more commands in a single communication; and receiving the ending status by the input/output communications adapter absent a tracking of state of individual commands by the input/output communications adapter, the ending status comprising timing information associated with the one or more commands.

21 Claims, 12 Drawing Sheets

U.S. PATENT DOCUMENTS

| | | |
|---|---|---|
| 4,080,649 A | 3/1978 | Calle et al. |
| 4,207,609 A | 6/1980 | Luiz et al. |
| 4,374,415 A | 2/1983 | Cormier et al. |
| 4,380,046 A | 4/1983 | Frosch et al. |
| 4,455,605 A | 6/1984 | Cormier et al. |
| 4,497,022 A | 1/1985 | Cormier et al. |
| 4,564,903 A | 1/1986 | Guyette et al. |
| 4,760,518 A | 7/1988 | Potash et al. |
| 4,779,188 A | 10/1988 | Gum et al. |
| 4,837,677 A | 6/1989 | Burrus, Jr. et al. |
| 4,843,541 A | 6/1989 | Bean et al. |
| 4,866,609 A | 9/1989 | Calta et al. |
| 4,870,566 A | 9/1989 | Cooper et al. |
| 5,016,160 A | 5/1991 | Lambeth et al. |
| 5,031,091 A | 7/1991 | Wakatsuki et al. |
| 5,040,108 A | 8/1991 | Kanazawa |
| 5,170,472 A | 12/1992 | Cwiakala et al. |
| 5,185,736 A | 2/1993 | Tyrrell et al. |
| 5,237,325 A | 8/1993 | Klein et al. |
| 5,265,240 A | 11/1993 | Galbraith et al. |
| 5,297,262 A | 3/1994 | Cox et al. |
| 5,301,323 A | 4/1994 | Maeurer et al. |
| 5,317,739 A | 5/1994 | Elko et al. |
| 5,386,512 A | 1/1995 | Crisman et al. |
| 5,388,219 A | 2/1995 | Chan et al. |
| 5,410,727 A | 4/1995 | Jaffe et al. |
| 5,414,851 A | 5/1995 | Brice, Jr. et al. |
| 5,434,980 A | 7/1995 | Casper et al. |
| 5,440,729 A | 8/1995 | Kimura et al. |
| 5,452,455 A | 9/1995 | Brown et al. |
| 5,461,721 A | 10/1995 | Cormier et al. |
| 5,465,359 A | 11/1995 | Allen et al. |
| 5,500,942 A | 3/1996 | Eickemeyer et al. |
| 5,526,484 A | 6/1996 | Casper et al. |
| 5,528,755 A | 6/1996 | Beardsley et al. |
| 5,539,918 A | 7/1996 | Allen et al. |
| 5,546,533 A | 8/1996 | Koyama |
| 5,548,791 A | 8/1996 | Casper et al. |
| 5,561,809 A | 10/1996 | Elko et al. |
| 5,564,040 A | 10/1996 | Kubala |
| 5,568,648 A | 10/1996 | Coscarella et al. |
| 5,584,039 A | 12/1996 | Johnson et al. |
| 5,600,793 A | 2/1997 | Nord |
| 5,600,805 A | 2/1997 | Fredericks et al. |
| 5,613,163 A | 3/1997 | Marron et al. |
| 5,640,600 A | 6/1997 | Satoh et al. |
| 5,640,603 A | 6/1997 | Meritt et al. |
| 5,644,712 A | 7/1997 | Coscarella et al. |
| 5,671,441 A | 9/1997 | Glassen et al. |
| 5,680,580 A | 10/1997 | Beardsley et al. |
| 5,758,190 A | 5/1998 | Johnson et al. |
| 5,768,620 A | 6/1998 | Johnson et al. |
| 5,793,983 A | 8/1998 | Albert et al. |
| 5,812,877 A | 9/1998 | Young |
| 5,831,985 A | 11/1998 | Sandorfi |
| 5,845,146 A | 12/1998 | Onodera |
| 5,860,022 A | 1/1999 | Kondou et al. |
| 5,894,583 A | 4/1999 | Johnson et al. |
| 5,901,327 A | 5/1999 | Ofek |
| 5,907,684 A | 5/1999 | Halma et al. |
| 5,918,028 A | 6/1999 | Silverthorn et al. |
| 5,996,026 A | 11/1999 | Onodera et al. |
| 6,125,411 A | 9/2000 | Sato |
| 6,195,330 B1 | 2/2001 | Sawey et al. |
| 6,230,218 B1 | 5/2001 | Casper et al. |
| 6,249,787 B1 | 6/2001 | Schleimer et al. |
| 6,263,380 B1 | 7/2001 | Tsuboi et al. |
| 6,343,335 B1 | 1/2002 | Dahman et al. |
| 6,347,334 B1 | 2/2002 | Fredericks et al. |
| 6,351,779 B1 | 2/2002 | Berg et al. |
| 6,353,612 B1 | 3/2002 | Zhu et al. |
| 6,460,087 B1 | 10/2002 | Saito et al. |
| 6,484,217 B1 | 11/2002 | Fuente et al. |
| 6,546,435 B1 | 4/2003 | Yoshimura et al. |
| 6,584,511 B1 | 6/2003 | Marsh, III et al. |
| 6,609,161 B1 | 8/2003 | Young |
| 6,647,016 B1 | 11/2003 | Isoda et al. |
| 6,651,125 B2 | 11/2003 | Maergner et al. |
| 6,658,603 B1 | 12/2003 | Ward |
| 6,693,880 B2 | 2/2004 | Gregg et al. |
| 6,694,390 B1 | 2/2004 | Bogin et al. |
| 6,751,680 B2 | 6/2004 | Langerman et al. |
| 6,751,683 B1 | 6/2004 | Johnson et al. |
| 6,769,009 B1 | 7/2004 | Reisman |
| 6,772,207 B1 | 8/2004 | Dorn et al. |
| 6,826,661 B2 | 11/2004 | Umbehocker et al. |
| 6,839,773 B2 | 1/2005 | Vishlitzky et al. |
| 6,862,322 B1 | 3/2005 | Ewen et al. |
| 6,898,202 B2 | 5/2005 | Gallagher et al. |
| 6,915,378 B2 | 7/2005 | Roberti |
| 6,950,888 B1 | 9/2005 | Rooney et al. |
| 7,000,036 B2 | 2/2006 | Carlson et al. |
| 7,003,700 B2 | 2/2006 | Elko et al. |
| 7,020,810 B2 | 3/2006 | Holman |
| 7,035,540 B2 | 4/2006 | Finan et al. |
| 7,058,735 B2 | 6/2006 | Spencer |
| 7,085,860 B2 | 8/2006 | Dugan et al. |
| 7,100,096 B2 | 8/2006 | Webb, Jr. et al. |
| 7,111,130 B2 | 9/2006 | Blake et al. |
| 7,120,728 B2 | 10/2006 | Krakirian et al. |
| 7,124,207 B1 | 10/2006 | Lee et al. |
| 7,133,988 B2 | 11/2006 | Fujibayashi |
| 7,149,823 B2 | 12/2006 | Miller et al. |
| 7,164,425 B2 | 1/2007 | Kwak et al. |
| 7,174,274 B2 | 2/2007 | Carlson et al. |
| 7,202,801 B2 | 4/2007 | Chou |
| 7,277,387 B2 | 10/2007 | Sanders et al. |
| 7,315,911 B2 | 1/2008 | Davies et al. |
| 7,373,435 B2 | 5/2008 | Carlson et al. |
| 7,382,733 B2 | 6/2008 | Banerjee et al. |
| 7,395,284 B2 | 7/2008 | Sato et al. |
| 7,398,335 B2 | 7/2008 | Sonksen et al. |
| 7,484,021 B2 | 1/2009 | Rastogi et al. |
| 7,500,023 B2 | 3/2009 | Casper et al. |
| 7,500,030 B2 | 3/2009 | Hathorn et al. |
| 7,502,873 B2 | 3/2009 | Casper et al. |
| 7,512,133 B2 | 3/2009 | Dugan et al. |
| 7,516,248 B2 | 4/2009 | Carlson et al. |
| 7,539,777 B1 | 5/2009 | Aitken |
| 7,543,087 B2 | 6/2009 | Philbrick et al. |
| 7,555,554 B2 | 6/2009 | Manders et al. |
| 7,558,827 B2 | 7/2009 | Kawashima et al. |
| 7,564,791 B2 | 7/2009 | Jayakrishnan et al. |
| 7,577,772 B2 | 8/2009 | Sonksen et al. |
| 7,577,773 B1 | 8/2009 | Gandhi et al. |
| 7,594,057 B1 | 9/2009 | Gandhi et al. |
| 7,599,360 B2 | 10/2009 | Edsall et al. |
| 7,600,053 B2 | 10/2009 | Carlson et al. |
| 7,711,871 B1 | 5/2010 | Haechten et al. |
| 7,743,197 B2 | 6/2010 | Chavan et al. |
| 7,765,336 B2 | 7/2010 | Butler et al. |
| 7,826,349 B2 | 11/2010 | Kaur et al. |
| 7,840,717 B2 | 11/2010 | Flanagan et al. |
| 7,840,718 B2 | 11/2010 | Ricci et al. |
| 7,840,719 B2 | 11/2010 | Casper et al. |
| 7,856,511 B2 | 12/2010 | Ricci et al. |
| 7,941,570 B2 | 5/2011 | Flanagan et al. |
| 2001/0030943 A1 | 10/2001 | Gregg et al. |
| 2002/0032810 A1 | 3/2002 | Wagner |
| 2002/0062407 A1 | 5/2002 | Tateyama et al. |
| 2002/0099967 A1 | 7/2002 | Kawaguchi |
| 2002/0152338 A1 | 10/2002 | Elliott et al. |
| 2002/0178404 A1 | 11/2002 | Austen et al. |
| 2003/0056000 A1 | 3/2003 | Mullendore et al. |
| 2003/0084213 A1 | 5/2003 | Brice, Jr. et al. |
| 2003/0103504 A1 | 6/2003 | Dugan et al. |
| 2003/0158998 A1 | 8/2003 | Smith |
| 2003/0187627 A1 | 10/2003 | Hild et al. |
| 2003/0188053 A1 | 10/2003 | Tsai |
| 2003/0208581 A1 | 11/2003 | Behren et al. |
| 2004/0030822 A1 | 2/2004 | Rajan et al. |
| 2004/0054776 A1 | 3/2004 | Klotz et al. |
| 2004/0113772 A1 | 6/2004 | Hong Chou |
| 2004/0125960 A1 | 7/2004 | Fosgate et al. |
| 2004/0136241 A1 | 7/2004 | Rapp et al. |
| 2004/0151160 A1 | 8/2004 | Sanders et al. |
| 2004/0193968 A1 | 9/2004 | Dugan et al. |

| | | |
|---|---|---|
| 2004/0210719 A1 | 10/2004 | Bushey et al. |
| 2004/0230706 A1 | 11/2004 | Carlson et al. |
| 2004/0260851 A1 | 12/2004 | Tu |
| 2005/0018673 A1 | 1/2005 | Dropps et al. |
| 2005/0102456 A1 | 5/2005 | Kang |
| 2005/0105456 A1 | 5/2005 | Cookson et al. |
| 2005/0108251 A1 | 5/2005 | Hunt |
| 2005/0175341 A1 | 8/2005 | Ovadia |
| 2005/0204069 A1 | 9/2005 | Carlson et al. |
| 2005/0216617 A1 | 9/2005 | Carlson et al. |
| 2005/0223291 A1 | 10/2005 | Zimmer et al. |
| 2005/0257118 A1 | 11/2005 | Shien |
| 2006/0036769 A1 | 2/2006 | Frey et al. |
| 2006/0050726 A1 | 3/2006 | Ahmed et al. |
| 2006/0075154 A1 | 4/2006 | Carlson et al. |
| 2006/0085595 A1 | 4/2006 | Slater |
| 2006/0159112 A1 | 7/2006 | Sundaram et al. |
| 2006/0224795 A1 | 10/2006 | Muto et al. |
| 2007/0005838 A1 | 1/2007 | Chang et al. |
| 2007/0016554 A1 | 1/2007 | Dapp et al. |
| 2007/0061463 A1 | 3/2007 | Hiramatsu et al. |
| 2007/0072543 A1 | 3/2007 | Paila et al. |
| 2007/0079022 A1 | 4/2007 | Carlson et al. |
| 2007/0079051 A1 | 4/2007 | Tanaka et al. |
| 2007/0091497 A1 | 4/2007 | Mizuno et al. |
| 2007/0162631 A1 | 7/2007 | Balakrishnan et al. |
| 2007/0174544 A1 | 7/2007 | Yasuda et al. |
| 2007/0239944 A1 | 10/2007 | Rupanagunta et al. |
| 2007/0294697 A1 | 12/2007 | Theimer et al. |
| 2008/0040519 A1 | 2/2008 | Starr et al. |
| 2008/0043563 A1 | 2/2008 | Brice et al. |
| 2008/0059638 A1 | 3/2008 | Hathorn et al. |
| 2008/0103754 A1 | 5/2008 | Carlson et al. |
| 2008/0103755 A1 | 5/2008 | Carlson et al. |
| 2008/0109580 A1 | 5/2008 | Carlson et al. |
| 2008/0147889 A1 | 6/2008 | Casper et al. |
| 2008/0147890 A1 | 6/2008 | Casper et al. |
| 2008/0183877 A1 | 7/2008 | Carlson et al. |
| 2008/0235553 A1 | 9/2008 | Chintada |
| 2008/0256264 A1 | 10/2008 | Muto et al. |
| 2008/0273518 A1 | 11/2008 | Pratt |
| 2008/0307122 A1 | 12/2008 | Butler et al. |
| 2009/0055585 A1 | 2/2009 | Fernandes et al. |
| 2009/0144586 A1 | 6/2009 | Casper et al. |
| 2009/0172203 A1 | 7/2009 | Casper et al. |
| 2009/0210557 A1 | 8/2009 | Gainey, Jr. et al. |
| 2009/0210559 A1 | 8/2009 | Flanagan et al. |
| 2009/0210560 A1 | 8/2009 | Yudenfriend et al. |
| 2009/0210561 A1 | 8/2009 | Ricci et al. |
| 2009/0210562 A1 | 8/2009 | Huang et al. |
| 2009/0210563 A1 | 8/2009 | Flanagan et al. |
| 2009/0210564 A1 | 8/2009 | Ricci et al. |
| 2009/0210570 A1 | 8/2009 | Bendyk et al. |
| 2009/0210571 A1 | 8/2009 | Casper et al. |
| 2009/0210572 A1 | 8/2009 | Yudenfriend et al. |
| 2009/0210573 A1 | 8/2009 | Yudenfriend et al. |
| 2009/0210576 A1 | 8/2009 | Casper et al. |
| 2009/0210579 A1 | 8/2009 | Bendyk et al. |
| 2009/0210580 A1 | 8/2009 | Bendyk et al. |
| 2009/0210581 A1 | 8/2009 | Flanagan et al. |
| 2009/0210582 A1 | 8/2009 | Bendyk et al. |
| 2009/0210583 A1 | 8/2009 | Bendyk et al. |
| 2009/0210584 A1 | 8/2009 | Carlson et al. |
| 2009/0210585 A1 | 8/2009 | Ricci et al. |
| 2009/0210768 A1 | 8/2009 | Carlson et al. |
| 2009/0210769 A1 | 8/2009 | Casper et al. |
| 2009/0210884 A1 | 8/2009 | Ricci et al. |
| 2009/0307388 A1 | 12/2009 | Tchapda |
| 2010/0014526 A1 | 1/2010 | Chavan et al. |
| 2010/0064072 A1 | 3/2010 | Tang et al. |

FOREIGN PATENT DOCUMENTS

| | | |
|---|---|---|
| JP | 63236152 | 10/1988 |
| JP | 2010-140127 A | 6/2010 |
| WO | WO2006102664 A2 | 9/2006 |

OTHER PUBLICATIONS

U.S. Appl. No. 12/030,967 Restriction Requirement Mailed Dec. 29, 2009.

ANSI INCITS 433-2007, Information Technology Fibre Channel Link Services (FC-LS), Jul. 2007.

Behrs, Jr, "Adaptive Prediction Minimizes Data Overrun and Underrun", IBM, Nov. 1994, pp. 1-3. http:// priorartdatabase.com/IPCOM/000114189.

Cakmakci, Melih, et al. "Bi-Directional Communication amoung "Smart" Compoents in a Networked Control System", University of Michigan: Department of Mechanical Engineering, 2005 American control conference, Jun. 8-10, 2005, Portland, OR, pp. 627-632.

Meritt, A.S. and J.H. Sorg, "Correction of Channel Measurement Data Caused by Control Unit Queuing," IBM Technical Disclosure Bulletin, vol. 33, No. 11, Apr. 1991, pp. 100-103.

Dauby, et al. "Contention Resolution Between Two Processors"; IBM Technical Disclosure Bulletin; vol. 26; No. 10A; Mar. 1984; 3 pages.

DeVeer, J.A.; "Control Frame Multiplexing on Serial I/O Channels"; IBM Technical Disclosure Bulletin; vol. 32; No. 10A; Mar. 1990; pp. 39-40.

Fibre Channel Single Byte Command Code Sets-2 Mapping Protocol (FC-SB-3), T11/Project 1357-D/Rev 1.6, INCITS Mar. 2003.

"Information Technology-Fibre Channel Protocol for SCSI, Third Version (FCP-3)," T10 Project 1560-D, Revision 4g, Sep. 13, 2005.

U.S. Appl. No. 12/031,038 Non-Final Office Action dated Nov. 16, 2009.

U.S. Appl. No. 12/030,912 Non-Final Office Action dated Mar. 18, 2010.

U.S. Appl. No. 12/030,920 Non-Final Office Action dated Feb. 23, 2010.

U.S. Appl. No. 12/030,975 Non-Final Office Action dated Oct. 22, 2009.

U.S. Appl. No. 12/030,932 Non-Final Office Action dated Dec. 16, 2009.

U.S. Appl. No. 12/031,023 Non-Final Office Action dated Oct. 29, 2009.

US Application No. I470034US Non-Final Office Action dated May 20, 2010.

U.S. Appl. No. 12/030,951 Non-Final Office Action dated Nov. 23, 2009.

U.S. Appl. No. 12/030,961 Non-Final Office Action dated Dec. 17, 2009.

U.S. Appl. No. 12/030,939 Non-Final Office Action dated Nov. 16, 2009.

U.S. Appl. No. 12/030,989 Non-Final Office Action dated Oct. 22, 2009.

U.S. Appl. No. 12/030,993 Non-Final Office Action dated Oct. 28, 2009.

U.S. Appl. No. 12/031,021 Non-Final Office Action dated Jan. 8, 2010.

U.S. Appl. No. 12/181,662—Non-Final Office Action dated Jun. 18, 2009.

U.S. Appl. No. 12/181,662—Final Office Action dated Jan. 4, 2010.

U.S. Appl. No. 12/031,038, Notice of Allowance Mailed Oct. 6, 2010.

U.S. Appl. No. 12/031,038, Non-Final Office Action Mailed Apr. 15, 2010.

Final Office Action for POU920070216US1 U.S. Appl. No. 12/030,912 mailed Oct. 6, 2010.

POU920070217US1_U.S. Appl. No. 12/031,182 Final Office Action Mailed Jul. 22, 2010.

U.S. Appl. No. 12/031,182, Non Final Office Action Mailed Dec. 23, 2010.

U.S. Appl. No. 12/030,920, Notice of Allowance Mailed Dec. 28, 2010.

U.S. Appl. No. 12/030,920 Notice of Allowance Mailed Aug. 23, 2010.

U.S. Appl. No. 12/030,954 Non-Final Office Action dated Jan. 21, 2010.

U.S. Appl. No. 12/030,954, Notice of Allowance mailed Dec. 28, 2010.

U.S. Appl. No. 12/030,975. Final Office Action Mailed May 13, 2010.

U.S. Appl. No. 12/030,975, Notice of Allowance Mailed Oct. 19, 2010.

U.S. Appl. No. 12/030,932, Final Office Action Mailed Jul. 23, 2010.

U.S. Appl. No. 12/030,932, Non-Final Office Action Mailed Dec. 16, 2010.
U.S. Appl. No. 12/031,023, Final Office Action Mailed Nov. 18, 2010.
U.S. Appl. No. 12/030,951, Final Office Action Mailed Oct. 26, 2010.
U.S. Appl. No. 12/030,961 Notice of Allowance Mailed Nov. 5, 2010.
U.S. Appl. No. 12/030,967 Notice of Allowance Mailed Oct. 7, 2010.
U.S. Appl. No. 12/030,967, Notice of Allowance mailed Apr. 23, 2010.
U.S. Appl. No. 12/031,201, Final Office Action Mailed Aug. 3, 2010.
U.S. Appl. No. 12/031,201, Non-Final Office Action Mailed Dec. 27, 2011.
U.S. Appl. No. 12/0303,985, Non Final Office Action Mailed May 5, 2010.
U.S. Appl. No. 12/030,985, Notice of Allowance mailed Nov. 24, 2010.
U.S. Appl. No. 12/030,993, Final Office Action Mailed Dec. 10, 2010.
U.S. Appl. No. 12/031,042, Final Office Action Mailed Oct. 25, 2010.
U.S. Appl. No. 12/031,042, Non-Final Office Action Mailed Apr. 5, 2010.
U.S. Appl. No. 12/031,021, Notice of Allowance Mailed Jul. 8, 2010.
U.S. Appl. No. 12/031,021, Notice of Allowance Mailed Apr. 30, 2010.
U.S. Appl. No. 12/181,662, Notice of Allowance Mailed Aug. 4, 2010.
U.S. Appl. No. 12/364,615, Non Final Office Action Mailed Oct. 7, 2010.
U.S. Appl. No. 12/183,305, Non-Final Office Action Mailed May 11, 2010.
U.S. Appl. No. 12/183,305, Notice of Allowance Mailed Nov. 1, 2010.
U.S. Appl. No. 12/183,315, Notice of Allowance Mailed Dec. 13, 2010.
U.S. Appl. No. 12/183,315 Notice of Allowance dated Sep. 15, 2010.
U.S. Appl. No. 12/183,323, Non-Final Office Action Mailed Jan. 3, 2011.
IBM, "Method and Apparatus to Monitor PAV Utilization", Feb. 2005, pp. 1-3. http://priorartdatabase.com/IPCOM/000082878.
IBM® z/Architecture Principles of Operation, Publication No. SA22-7832-05, 6th Edition, Apr. 2007. 1,215 pages separated into 4 electronic attachments_Part 1.
IBM® z/Architecture Principles of Operation, Publication No. SA22-7832-05, 6th Edition, Apr. 2007. 1,215 pages separated into 4 electronic attachments. Part 2.
IBM® z/Architecture Principles of Operation, Publication No. SA22-7832-05, 6th Edition, Apr. 2007. 1,215 pages separated into 4 electronic attachments. Part 3.
IBM® z/Architecture Principles of Operation, Publication No. SA22-7832-05, 6th Edition, Apr. 2007. 1,215 pages separated into 4 electronic attachments. Part 4.
Z/Series Input/Output Configuration Program user•s Guide for IYP IOCP, SB10-7029-03c. International Business Machines Corporation, Jun. 2003.
Iren, et al.; "The Transport Layer: Tutorial and Survey"; ACM Computing Surveys; vol. 31, No. 4; Dec. 1999; pp. 360-405.
Ishikawa, Hikaru, et al. "Bi-Directional OFDM Transmission using Adaptive Modulation that spreads Data Symbols". Power Line Communications and its Applications, 2006, IEEE International Symposium on, vol., No., pp. 202-207.
International Search Report and Written Opinion for PCT/EP2009/051447 dated Jul. 1, 2009.
International Search Report and Written Opinion for PCT/EP2009/051483 dated Jul. 27, 2009.
Written Opinion and International Search Report for PCT/EP2009/051445 dated Jun. 25, 2009.
Written Opinion and International Search Report for PCT/EP2009/051446 dated Jun. 25, 2009.
Written Opinion and International Search Report for PCT/EP2009/051461 dated Sep. 22, 2009.
Written Opinion and International Search Report for PCT/EP2009/051462 dated Jul. 1, 2009.
Written Opinion and International Search Report for PCT/EP2009/051450 dated Jul. 7, 2009.
Written Opinion and International Search Report for PCT/EP2009/051459 dated Jun. 23, 2009.
Written Opinion and International Search Report for PCT/EP2009/051463 dated Jul. 22, 2009.
Moore et al., Reconfiguration of Storage Elements to Improve Performance, IBM, Dec. 1983, pp. 1-3. http://priorartdatabas.com/IPCOM/000047719.
Nordstrom.; "Sequence Reception Method for a Fibre Channel Protocol Chip"; IBM Technical Disclosure Bulletin; vol. 38, No. 12; Dec. 1995; pp. 267-269.
Peterson; "Information Techonology, Fibre Channel Protocol for SCSI, Fourth Version (FCP-3)", Draft Proposed American National Standard, Jun. 2004; pp. 1-142.
Patent No. 7,000,036 Notice of Allowance dated Feb. 3, 2006.
Patent No. 7,000,036 Non-Final Office Action dated Jul. 15, 2005.
Patent No. 7,174,274 Non-Final Office Action dated Jun. 8, 2006.
Patent No. 7,174,274 Non-Final Office Action dated Jun. 21, 2006.
Patent No. 7,174,274 Notice of Allowance Sep. 13, 2007.
Patent No. 7,174,274 Notice of Allowance Dec. 27, 2006.
U.S. Appl. No. 11/126,728 Non-Final Office Action Apr. 16, 2007.
Patent No. 7,373,435 Non-Final Office Action Jun. 11, 2007.
Patent No. 7,373, 435 Non-Final Office Action Sep. 13, 2007.
Patent No. 7,373,435 Notice of Allowance dated Apr. 30, 2008.
U.S. Appl. No. 11/469,573 Non-Final Office Action dated Apr. 11, 2008.
Patent No. 7,600,053 Non-Final Office Action dated Mar. 17, 2009.
Patent No. 7,600,053 Notice of Allowance dated Aug. 26, 2009.
U.S. Appl. No. 11/965,866 Non-Final Office Action dated Jun. 3, 2010.
Patent No. 7,516,248 Notice of Allowance Feb. 20, 2009.
U.S. Appl. No. 11/548,060 Non-Final Office Action dated Apr. 15, 2008.
U.S. Appl. No. 11/548,093 Non-Final Office Action dated Apr. 17, 2008.
U.S. Appl. No. 12/031,182 Non-Final Office Action dated Jan. 22, 2010.
U.S. Application No. 12/031,201 Non-Final Office Action dated Jan. 25, 2010.
U.S. Appl. No. 12/030,989 Final Office Action dated May 24, 2010.
U.S. Appl. No. 12/183,315, Notice of Allowance Mailed on Jun. 15, 2010.
International Search Report; International Application No. PCT/EP2009/059184; International Filing Date: Jul. 16, 2009; Date of mailing: Jan. 14, 2010; 9 pages.
"Protocol for Insochronous Traffic Over Fiber Channel Switching"; IBM Technical Disclosure Bulletin; vol. 37, No. 06B; Jun. 1994. pp. 377-380.
Golasky, Richard; "Link-Level Error Recovery With Tape Backup"; Dell Power Solutions; Aug. 2005; pp. 88-91.
Sachs, M.W.; "I/O Marker Changing"; IBM Technical Disclosure Bulletin; vol. 37, No. 02A; Feb. 1994; pp. 75-76.
SCSI Primary Commands—4 (SPC-4); Project T10/1731-D. Rev 11. INCITS Apr. 14, 2010.
Simmons et al.; "A Performance Comparison of Three Supercomputers: Fujitsu VP-2600, NEC SX-3, and CRAY Y-MP"; ACM, Conference on High Performance Networking and Computing, Proceedings of the 1991 ACM/IEEE conference on Supercomputing, Albuquerque, New Mexico; Jul. 1991; pp. 150-157.
Snively, et al.; "Fibre Channel, Framing and Signaling"; (FC-FS) Rev. 1.70; NCITS Working Draft Proposed American National Standard for Information Technology; Feb. 2002; pp. i-575.
Snively et al.; Fibre Channel Single Byte Command Code Sets-3 Mapping Protocol (FC-SB-3); T11/Project 1357- D/Rev. 1.6, INCITS; Mar. 2003; pp. 1-206.
Srikrishnan et al.; "Sharing FCP Adapters Through Virtualization"; IBM J. Res. & Dev., vol. 51, No. 1/2; Jan./Mar. 2007; pp. 103-118.
Stone, et al.; "When The CRC and TCP Checksum Disagree"; SIGCOMM '00, Stockholm, Sweden; Jul. 2000; 10 pages.
Laudon et al. •System Overview of the SGI Origin 200/2000 Product Line, 1997, iEEE Publication pp. 150-156.

Tachikawa, T., et al. "ARQ protocols for bi-directional data transmission," Information Networking, 1998 (ICOIN-12) Proceedings., Twelfth International Conference on., vol., No., pp. 468-473, Jan. 21-23, 1998.
U.S. Appl. No. 12/183,315 filed on Jul. 31, 2008.
U.S. Appl. No. 12/183,323 filed on Jul. 31, 2008.
U.S. Appl. No. 12/030,939 Notice of Allowance mailed Jun. 29, 2010.
U.S. Appl. No. 12/030,954 Non Final Office Action mailed Jul. 12, 2010.
U.S. Appl. No. 12/030,961 Final Office Action mailed Jul. 12, 2010.
U.S. Appl. No. 12/030,993 Non Final Office Action mailed Jun. 28, 2010.
U.S. Appl. No. 12/031,021 Notice of Allowance mailed Jul. 8, 2010.
U.S. Appl. No. 12/031,023 Non Final Office Action mailed Jun. 11, 2010.
U.S. Appl. No. 12/183,323 Non Final Office Action mailed Jul. 19, 2010.
U.S. Appl. No. 12/392,246 Notice of Allowance mailed Jul. 15, 2010.
U.S. Appl. No. 12/183,305 filed on Jul. 31, 2008.
"z/Architecture-Principles of Operation," IBM Publication No. SA22-7832-04, 5th Ed., Sep. 2005.
Aboda, B.-et al.; Network Working Group; "Securing Block Storage Protocols Over IP"; ACM Digital Library; RFC3723; Apr. 2004.
Azimi, R.-et al.; "miNI: Reducing Network Interface Memory Requirements with Dynamic Handle Lookup"; ACM Digital Library; pp. 261-272; Jun. 2003.
Emulex Corporation; "Install the LP850 Host Adapter"; Google/Emulex Corporation, LightPulse LP850 Fibre Channel PCI Host Adapter Manuals; pp. 1-10, 1999.
Foong, A.-et al.; "Towards SSD-Ready Enterprise Platforms"; Google/Intel Corporation; 2008-2009.
Hewlett-Packard Company; HP A4800A PCI FWD SCSI Host Bus Adapter—Service & User Guide, Edition 6; Google/H-P; 2001.
Hewlett-Packard Company; "HP A5149 PCI Ultra2 SCSI Host Bus Adapter—Service and User Guide", Edition 2; Google/H-P; 2001.
POU920070301US1, U.S. Appl. No. 12/030,951, Notice of Allowance Mailed Apr. 4, 2011.
POU920060228US2, U.S. Appl. No. 12/364,615, Notice of Allowance Mailed Mar. 10, 2011.
Jiang, J.-et al.; "The Role of FCoE in I/O Consolidation"; ACM Digital Library/International Conf on Advanced Infocomm Technology '08; Jul. 2008.
Josephson, WK.-et al.; "DFS: A File System for Virtualized Flash Storage"; ACM Digital Library; vol. 6, No. 3, Article 14, Sep. 2010.
LSI Corporation; "PCI Express to 6Gb/s SAS Host Bus Adapters"; Google; Chapter 1, Introduction/Overview; LSI User Guide; Oct. 2009.
LSI; "ScsiPortGetDeivceBase"; Google/LSI; Apr. 2003.
Magoutis, K.; "The Optimistic Direct Access File System: Design and Network Interface Support"; Division Of Engineering & Applied Science, Harvard Univ.; Feb. 2002.
Miller, DJ.-et al.; "Motivating Future Interconnects: A Differential Measurement Analysis of PCI Latency"; ACM Digital Library; pp. 94-105; Oct. 2009.
Network Storage Systems; Google; Oct. 2007.
Sun, Oracle; "Sun Storage 6 Gb SAS PCIe HBA, External—Installation Guide for HBA Models"; Google; Revision A; Nov. 2010.
Petersen, MK.-et al.; "DIF/DIX Aware Linux SCSI HBA Interface"; Google; Oracle Linux Engineering; Jul. 2008.
Satran, J.-et al.; Network Working Group; "Internet Small Computer Systems Interface (iSCSI)"; ACM Digital Library; RFC3720; Apr. 2004.
Vaghani, SB.; "Virtual Machine File System"; VMWare Inc./ACM Digital Library; pp. 57-69; 2008-2009.
U.S. Appl. No. 12/030,912 Non Final Office Action Mailed Aug. 18, 2011.
U.S. Appl. No. 12/031,182 Final Office Action dated Oct. 20, 2011.
U.S. Appl. No. 12/030,925, Notice of Allowance Mailed Sep. 7, 2011.
U.S. Appl. No. 13/075,993 Non Final Office Action Mailed Aug. 31, 2011.
U.S. Appl. No. 12/030,932, Notice of Allowance mailed Nov. 1, 2011.
U.S. Appl. No. 12/030,981 Non Final Office Action Mailed Aug. 2, 2011.
POU920070218US1, U.S. Appl. No. 12/030,938, Notice of Allowance Mailed Aug. 8, 2011.
U.S. Appl. No. 12/031,201 Final Office Action dated Jun. 13, 2011.
POU920080042US1, U.S. Appl. No. 12/030,989, Notice of Allowance Mailed Aug. 5, 2011.
U.S. Appl. No. 12/031,042, Non-Final Office Action Mailed Sep. 30, 2011.
U.S. Appl. No. 12/946,514, Non-Final Office Action Mailed Jun. 23, 2011.
U.S. Appl. No. 12/183,323, Notice of Allowance mailed Jun. 23, 2011.

SYSTEM AND PROGRAM PRODUCTS FOR FACILITATING INPUT/OUTPUT PROCESSING BY USING TRANSPORT CONTROL WORDS TO REDUCE INPUT/OUTPUT COMMUNICATIONS

CROSS-REFERENCE TO RELATED APPLICATIONS

This application is a continuation of U.S. patent application Ser. No. 12/392,246, filed Feb. 25, 2009, entitled "SYSTEM AND PROGRAM PRODUCTS FOR FACILITATING INPUT/OUTPUT PROCESSING BY USING TRANSPORT CONTROL WORDS TO REDUCE INPUT/OUTPUT COMMUNICATIONS", by Casper et al., issued as U.S. Pat. No. 7,840,719, which is a continuation of U.S. patent application Ser. No. 11/548,060, filed Oct. 10, 2006, entitled "FACILITATING INPUT/OUTPUT PROCESSING BY USING TRANSPORT CONTROL WORDS TO REDUCE INPUT/OUTPUT COMMUNICATIONS," by Casper et al., issued as U.S. Pat. No. 7,500,023, both of which are hereby incorporated herein by reference in their entirety This application also contains subject matter which is related to the subject matter of the following applications, assigned to the same assignee as this application and hereby incorporated herein by reference in their entirety:

"FACILITATING ACCESS TO STATUS AND MEASUREMENT DATA ASSOCIATED WITH INPUT/OUTPUT PROCESSING," Casper et al., U.S. Ser. No. 11/548,093, filed Oct. 10, 2006, and published on Jun. 19, 2008 as U.S. Publication No. 2008/0147890 A1; and "SYSTEM AND PROGRAM PRODUCTS FOR FACILITATING ACCESS TO STATUS AND MEASUREMENT DATA ASSOCIATED WITH INPUT/OUTPUT PROCESSING," Casper et al. (POU920060228US2), U.S. Ser. No. 12/364,615, filed Feb. 3, 2009, and published Jun. 4, 2009 as U.S. Publication No. 20090144586 A1.

BACKGROUND OF THE INVENTION

1. Field of Invention

This invention relates, in general, to input/output processing, and in particular, to using a transport control word to reduce input/output communications during input/output processing.

2. Description of Background

Input/output (I/O) operations are used to transfer data between memory and input/output devices of a processing environment. Specifically, data is written from memory to one or more input/output devices, and data is read from one or more input/output devices to memory by executing input/output operations.

To facilitate processing of input/output operations, an input/output subsystem of the processing environment is employed. The input/output subsystem is coupled to main memory and the input/output devices of the processing environment and directs the flow of information between memory and the input/output devices. One example of an input/output subsystem is a channel subsystem. The channel subsystem uses channel paths as communications media. Each channel path includes a channel coupled to a control unit, the control unit being further coupled to one or more input/output devices.

The channel subsystem employs channel command words to transfer data between the input/output devices and memory. A channel command word specifies the command to be executed, and for commands initiating certain I/O operations, it designates the memory area associated with the operation, the action to be taken whenever transfer to or from the area is completed, and other options.

During input/output processing, a list of channel command words is fetched from memory by a channel. The channel parses each command from the list of channel command words and forwards a number of the commands, each command in it's own entity, to a control unit coupled to the channel. The control unit then processes the commands. The channel tracks the state of each command and controls when the next set of commands are to be sent to the control unit for processing. The channel ensures that each command is sent to the control unit in it's own entity.

BRIEF SUMMARY OF THE INVENTION

Enhancements to the above processing of commands are needed. For example, a need exists for a capability that enables multiple commands to be sent to the control unit as a single entity. A further need exists for a capability that eliminates the need for the channel to track the status of the individual commands being executed by the control unit. A need exists for a capability that reduces communication (e.g., exchanges and sequences) between the channel and control unit during I/O processing.

An embodiment of a computer program product for facilitating input/output processing of a processing environment includes a tangible storage medium readable by a processing circuit and storing instructions for execution by the processing circuit for performing a method. The method includes, for instance: obtaining by an input/output communications adapter of the processing environment a transport control word, the transport control word including a count of the total amount of data being transferred, an address of a channel command word descriptor to be sent to a control unit of the processing environment, in which the channel command word descriptor is configured to contain a plurality of commands to be executed by the control unit, an address that informs the input/output communications adapter where to store or fetch data received from or transmitted to the control unit, and an address of a location to store ending status received from the control unit; forwarding from the input/output communications adapter to the control unit the channel command word descriptor that includes one or more commands as one entity, wherein the forwarding includes forwarding from the input/output communications adapter to the control unit the channel command word descriptor including the one or more commands in a single communication; and receiving the ending status by the input/output communications adapter absent a tracking of state of individual commands by the input/output communications adapter, the ending status comprising timing information associated with the one or more commands.

An embodiment of an apparatus for facilitating input/output processing of a processing environment includes an input/output communications adapter of the processing environment configured to communicate with a control unit of the processing environment, the control unit configured to operate and control one or more I/O devices, the input/output communications adapter configured to perform a method. The method includes, for instance: obtaining by the input/output communications adapter a transport control word, the transport control word including a count of the total amount of data being transferred, an address of a channel command word descriptor to be sent to the control unit, in which the channel command word descriptor is configured to contain a plurality of commands to be executed by the control unit, an address that informs the input/output communications adapter where to store or fetch data received from or transmitted to the control unit, and an address of a location to store ending status received from the control unit; forwarding from the input/output communications adapter to the control unit the channel command word descriptor that includes one or more commands as one entity, wherein the forwarding includes forwarding from the input/output communications adapter to the control unit the channel command word descriptor including the one or more commands in a single communication; and receiving the ending status by the input/output communications adapter absent a tracking of state of individual commands by the input/output communications adapter, the ending status comprising timing information associated with the one or more commands.

An embodiment of a method of facilitating input/output processing of a processing environment includes: obtaining by an input/output communications adapter of the processing environment a transport control word, the transport control word including a count of the total amount of data being transferred, an address of a channel command word descriptor to be sent to a control unit of the processing environment, in which the channel command word descriptor is configured to contain a plurality of commands to be executed by the control unit, an address that informs the input/output communications adapter where to store or fetch data received from or transmitted to the control unit, and an address of a location to store ending status received from the control unit; forwarding from the input/output communications adapter to the control unit the channel command word descriptor that includes one or more commands as one entity, wherein the forwarding includes forwarding from the input/output communications adapter to the control unit the channel command word descriptor including the one or more commands in a single communication; and receiving the ending status by the input/output communications adapter absent a tracking of state of individual commands by the input/output communications adapter, the ending status comprising timing information associated with the one or more commands.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
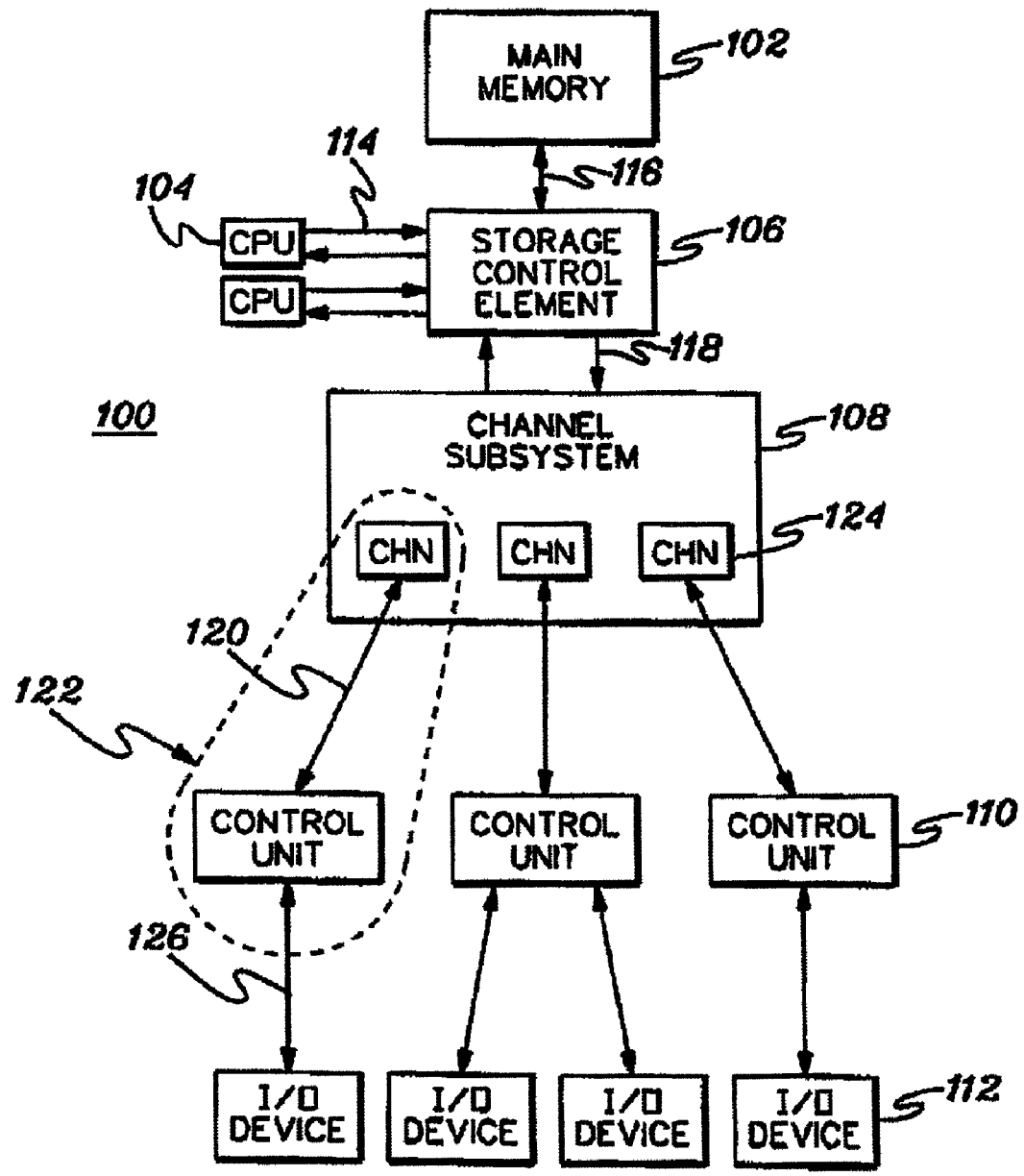
FIG. 1 depicts one embodiment of a processing environment incorporating and using one or more aspects of the present invention.

In accordance with an aspect of the present invention, input/output processing is facilitated by reducing communications between components of a processing environment used to perform the input/output processing. For instance, the number of exchanges and sequences between an input/output (I/O) communications adapter, such as a channel, and a control unit is reduced. This is accomplished by sending a plurality of commands from the I/O communications adapter to the control unit as a single entity for execution by the control unit, and by the control unit sending the data resulting from the commands, if any, as a single entity.

The plurality of commands are included in a descriptor, referred to herein as a channel command word descriptor, an address of which is specified in a transport control word. The transport control word is sent from the operating system or other application to the I/O communications adapter, which in turn forwards the descriptor to the control unit for processing. The control unit processes each of the commands absent a tracking of status relative to those individual commands by the I/O communications adapter.

One example of a processing environment incorporating and using one or more aspects of the present invention is described with reference to FIG. 1. Processing environment 100 includes, for instance, a main memory 102, one or more central processing units (CPU) 104, a storage control element 106, a channel subsystem 108, one or more control units 110 and one or more input/output (I/O) devices 112, each of which is described below.

Main memory 102 stores data and programs, which are input from input devices 112. Main memory 102 is directly addressable and provides for high-speed processing of data by central processing units 104 and channel subsystem 108.

Central processing unit 104 is the controlling center of environment 100. It contains the sequencing and processing facilities for instruction execution, interruption action, timing functions, initial program loading, and other machine-related functions. Central processing unit 104 is coupled to storage control element 106 via a connection 114, such as a bidirectional or unidirectional bus.

Storage control element 106 is coupled to main memory 102 via a connection 116, such as a bus; to central processing units 104 via connection 114; and to channel subsystem 108 via a connection 118. Storage control element 106 controls, for example, the queuing and execution of requests made by CPU 104 and channel subsystem 108.

Channel subsystem 108 is coupled to storage control element 106, as described above, and to each of the control units via a connection 120, such as a serial link. Channel subsystem 108 directs the flow of information between input/output devices 112 and main memory 102. It relieves the central processing units of the task of communicating directly with the input/output devices and permits data processing to proceed concurrently with input/output processing. The channel subsystem uses one or more channel paths 122 as the communication links in managing the flow of information to or from input/output devices 112. As a part of the input/output processing, channel subsystem 108 also performs the path-management functions of testing for channel path availability, selecting an available channel path and initiating execution of the operation with the input/output devices.

Each channel path 122 includes a channel 124 (channels are located within the channel subsystem, in one example, as shown in FIG. 1), one or more control units 110 and one or more connections 120. In another example, it is also possible to have one or more dynamic switches as part of the channel path. A dynamic switch is coupled to a channel and a control unit and provides the capability of physically interconnecting any two links that are attached to the switch.

Also located within channel subsystem 108 are subchannels (not shown). One subchannel is provided for and dedicated to each input/output device accessible to a program through the channel subsystem. A subchannel (e.g., a data structure, such as a table) provides the logical appearance of a device to the program. Each subchannel provides information concerning the associated input/output device 112 and its attachment to channel subsystem 108. The subchannel also provides information concerning input/output operations and other functions involving the associated input/output device. The subchannel is the means by which channel subsystem 108 provides information about associated input/output devices 112 to central processing units 104, which obtain this information by executing input/output instructions.

Channel subsystem 108 is coupled to one or more control units 110. Each control unit provides the logic to operate and control one or more input/output devices and adapts, through the use of common facilities, the characteristics of each input/output device to the link interface provided by the channel. The common facilities provide for the execution of input/output operations, indications concerning the status of the input/output device and control unit, control of the timing of data transfers over the channel path and certain levels of input/output device control.

Each control unit 110 is attached via a connection 126 (e.g., a bus) to one or more input/output devices 112. Input/output devices 112 receive information or store information in main memory 102 and/or other memory. Examples of input/output devices include card readers and punches, magnetic tape units, direct access storage devices, displays, keyboards, printers, pointing devices, teleprocessing devices, communication controllers and sensor based equipment, to name a few.

One or more of the above components of the processing environment are further described in "IBM® z/Architecture Principles of Operation," Publication No. SA22-7832-04, 5th Edition, September 2005; U.S. Pat. No. 5,461,721 entitled "System For Transferring Data Between I/O Devices And Main Or Expanded Storage Under Dynamic Control Of Independent Indirect Address Words (IDAWS)," Cormier et al., issued Oct. 24, 1995; and U.S. Pat. No. 5,526,484 entitled "Method And System For Pipelining The Processing Of Channel Command Words," Casper et al., issued Jun. 11, 1996, each of which is hereby incorporated herein by reference in its entirety. IBM is a registered trademark of International Business Machines Corporation, Armonk, N.Y., USA. Other names used herein may be registered trademarks, trademarks or product names of International Business Machines Corporation or other companies.

Figure 2A:
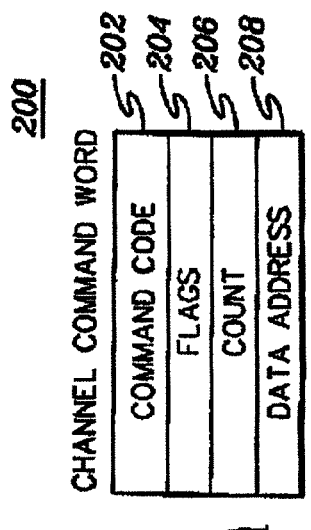
FIG. 2a depicts one example of a channel command word.

In one embodiment, to transfer data between devices 112 and memory 102, channel command words are used. A channel command word specifies the command to be executed, and includes other fields to control processing. One example of a channel command word is described with reference to FIG. 2a. A channel command word 200 includes, for instance, a command code 202 specifying the command to be executed (e.g., read, read backward, control, sense and write); a plurality of flags 204 used to control the I/O operation; for commands that specify the transfer of data, a count field 206 that specifies the number of bytes in the storage area designated by the CCW to be transferred; and a data address 208 that points to a location in main memory that includes data, when direct addressing is employed, or to a list (e.g., contiguous list) of modified indirect data address words (MIDAWs) to be processed, when modified indirect data addressing is employed. Modified indirect addressing is further described in U.S. application Ser. No. 11/464,613, entitled "Flexibly Controlling The Transfer Of Data Between Input/Output Devices And Memory," Brice et al., filed Aug. 15, 2006, which is hereby incorporated herein by reference in its entirety.

One or more channel command words (CCWs) arranged for sequential execution form a channel program, referred to herein as a CCW channel program. The CCW channel program is set up by, for instance, the operating system, or other software. The software sets up the CCWs and obtains the addresses of memory assigned to the channel program. An example of a CCW channel program is described with reference to FIG. 2b. A CCW channel program 210 includes, for instance, a define extent channel command word (CCW) 212 that has a pointer 214 to a location in memory of define extent data 216 to be used with the define extent command. In this example, a transfer in channel (TIC) 218 follows the define extent command that refers the channel program to another area in memory (e.g., an application area) that includes one or more other CCWs, such as a locate record 217 that has a pointer 219 to locate record data 220, and one or more read CCWs 221. Each read CCW 220 has a pointer 222 to a data area 224. The data area includes an address to directly access the data or a list of data address words (e.g., MIDAWs or IDAWs) to indirectly access the data. Further, CCW channel program 210 includes a predetermined area in the channel subsystem defined by the device address called the subchannel for status 226 resulting from execution of the CCW channel program.

The processing of a CCW channel program is described with reference to FIG. 3, as well as with reference to FIG. 2b. In particular, FIG. 3 shows an example of the various exchanges and sequences that occur between a channel and a control unit when a CCW channel program is executing. The link protocol used for the communications is FICON (Fibre Connectivity), in this example. Information regarding FICON is described in "Fibre Channel Single Byte Command Code Sets-2 Mapping Protocol (FC-SB-3), T11/Project 1357-D/Rev. 1.6, INCITS (March 2003), which is hereby incorporated herein by reference in its entirety.

Referring to FIG. 3, a channel 300 opens an exchange with a control unit 302 and sends a define extent command and data associated therewith 304 to control unit 302. The command is fetched from define extent CCW 212 (FIG. 2b) and the data is obtained from define extent data area 216. The channel uses TIC 218 to locate the locate record CCW and the read CCW. It fetches the locate record command 305 (FIG. 3) from the locate record CCW 217 (FIG. 2b) and obtains the data from locate record data 220. The read command 306 (FIG. 3) is fetched from read CCW 221 (FIG. 2b). Each is sent to the control unit.

The control unit opens an exchange 308 with the channel, in response to the open exchange of the channel. This can occur before or after locate command 305 and/or read command 306. Along with the open exchange, a response (CMR) is forwarded to the channel. The CMR provides an indication to the channel that the control unit is active and operating.

The control unit sends the requested data 310 to the channel. Additionally, the control unit provides the status to the channel and closes the exchange 312. In response thereto, the channel stores the data, examines the status and closes the exchange 314, which indicates to the control unit that the status has been received.

The processing of the above CCW channel program to read 4 k of data requires two exchanges to be opened and closed and seven sequences. In accordance with an aspect of the present invention, the number of exchanges and sequences between the channel and control unit is reduced by collapsing multiple commands of the channel program into one command word, referred to as a transport control word (TCW). Specifically, the transport control word points to a channel command word descriptor (CCWD) that includes the multiple commands. The TCW is executed by the host channel and is not sent or seen by the control unit.

One example of a channel program to read 4 k of data, as in FIG. 2b, but includes a transport control word, instead of separate individual channel command words, is described with reference to FIG. 4. As shown, a channel program 400, referred to herein as a TCW channel program, includes a transport control word 402 specifying a location in memory of a channel command word descriptor (CCWD) 404, as well as a location in memory of a data area 406 or a MIDAL 410 (i.e., a list of MIDAWs) that points to data area 406, and a status area 408. Transport control words, channel command word descriptors and status are described in further detail below.

The processing of a TCW channel program is described with reference to FIG. 5. The link protocol used for these communications is, for instance, the fibre channel protocol (FCP). In particular, the three phases of the FCP link protocol are used, allowing host bus adapters to be used that support FCP to support data transfers controlled by CCWs. FCP and its phases are described further in "Information Technology—Fibre Channel Protocol for SCSI, Third Version (FCP-3)," T10 Project 1560-D, Revision 4, Sep. 13, 2005, which is hereby incorporated herein by reference in its entirety.

Figure 5:
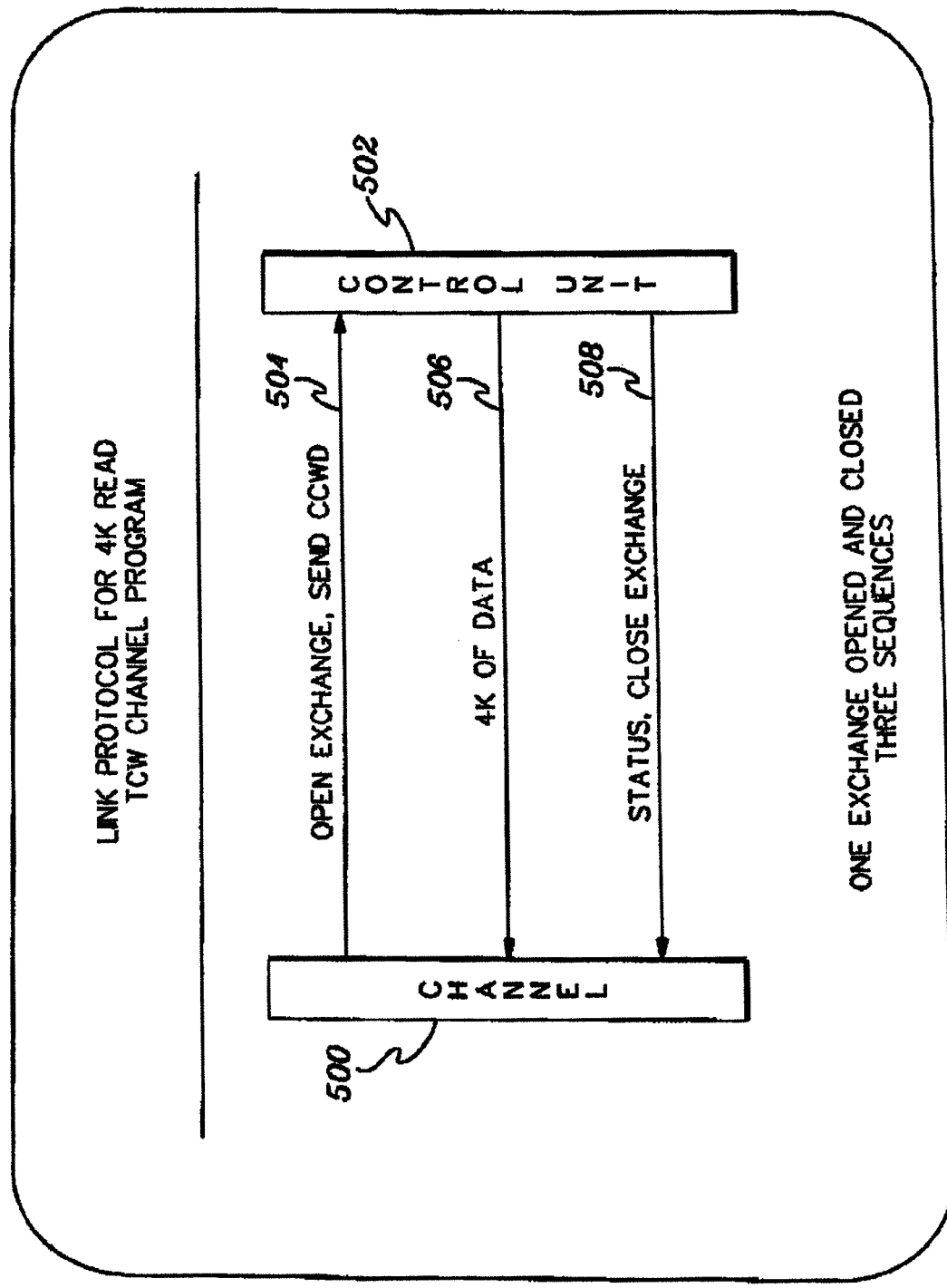
FIG. 5 depicts one embodiment of a link protocol used to communicate between a channel and control unit to execute the transport control word channel program of FIG. 4, in accordance with an aspect of the present invention.

Referring to FIG. 5, a channel 500 opens an exchange with a control unit 502 and sends the channel command word descriptor 504 to the control unit. In one example the CCWD and sequence initiative are transferred to the control unit in a FCP command, referred to as FCP_CMND IU. The control unit executes the multiple commands of the channel command word descriptor (e.g., define extent command, locate record command, read command) and forwards the data 506 to the channel via, for instance, a FCP_Data IU. It also provides status and closes the exchange 508. As one example, final status is sent in a FCP status frame that has a bit active in, for instance, byte 10 or 11 of the FCP_RSP IU Payload. The FCP_RES_IU Payload is used to transport FICON ending status along with the control unit queue time, disconnect time, active time, the offset of the last DCW executed, the residual data byte count of the last DCW executed, the residual data byte count of the CCWD, and possible sense data.

In a further example, to write 4 k of customer data, the channel uses the FCP link protocol phases, as follows:
1. Transfer the CCWD in the FCP_CMND IU.
2. Transfer the IU of data, and sequence initiative to the control unit. (FCP Transfer Ready Disabled)
3. Final status is sent in a FCP status frame that has a bit active in, for instance, byte 10 or 11 of the FCP_RSP IU Payload. The FCP_RES_INFO field or sense field is used to transport FICON ending status along with the control unit queue time, disconnect time, active time, the offset of the last DCW executed, the residual data byte count of the last DCW executed, the residual data byte count of the CCWD, and possible sense data.

Figure 2B:
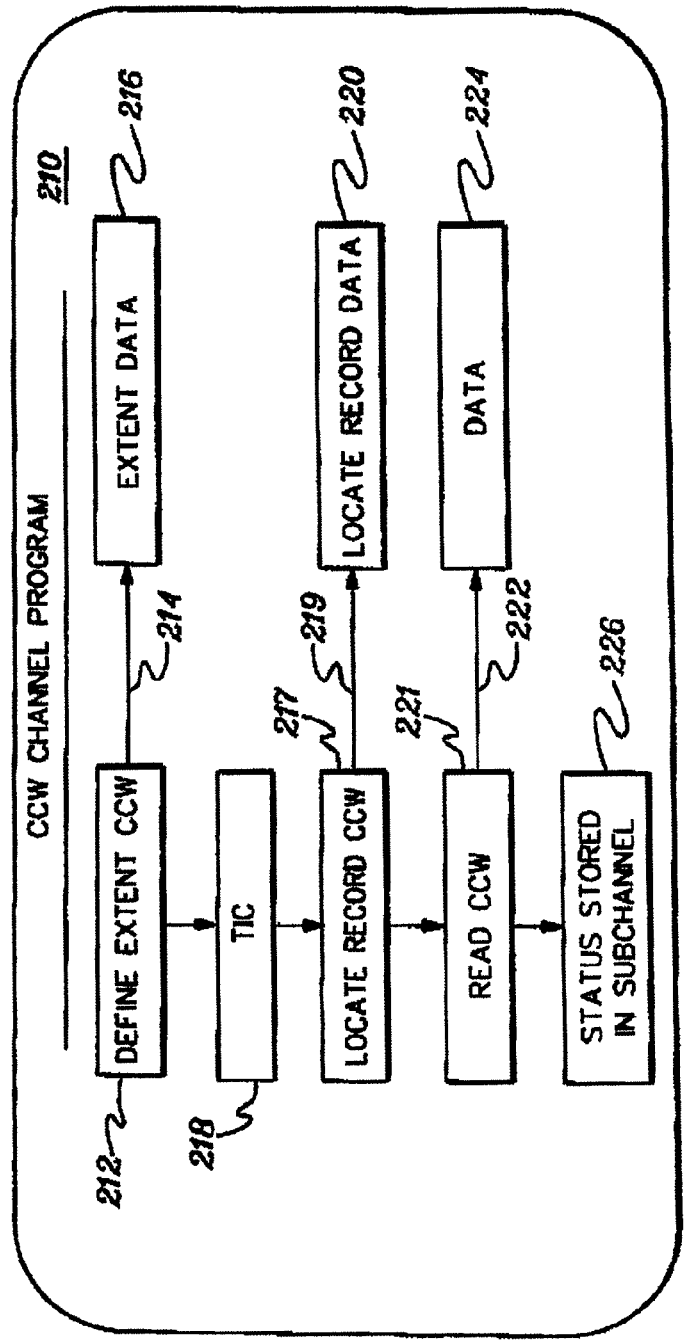
FIG. 2b depicts one example of a channel command word channel program.
Figure 3:
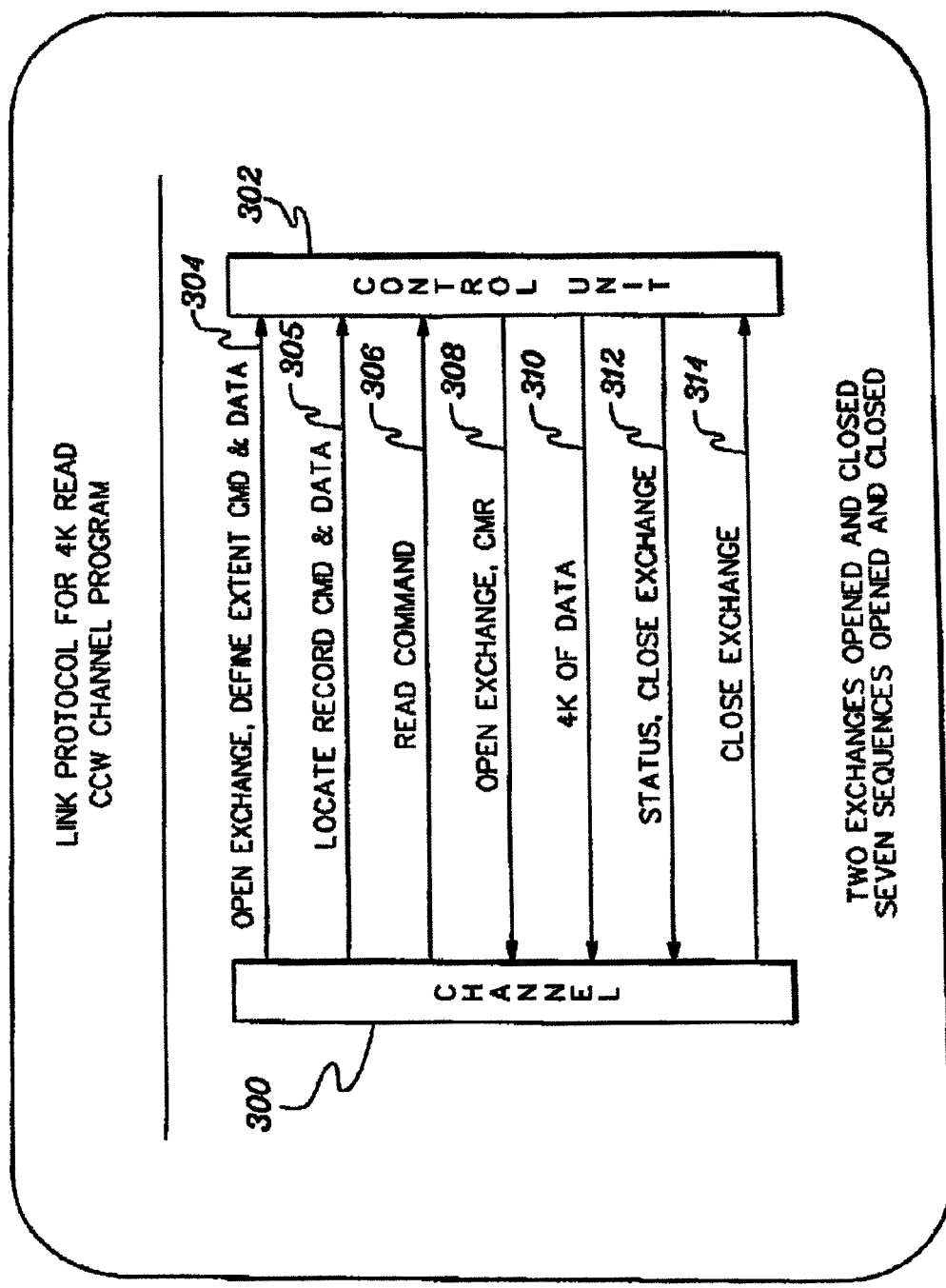
FIG. 3 depicts one embodiment of a link protocol used in communicating between the channel and control unit to execute the channel command word channel program of FIG. 2b.
Figure 4:
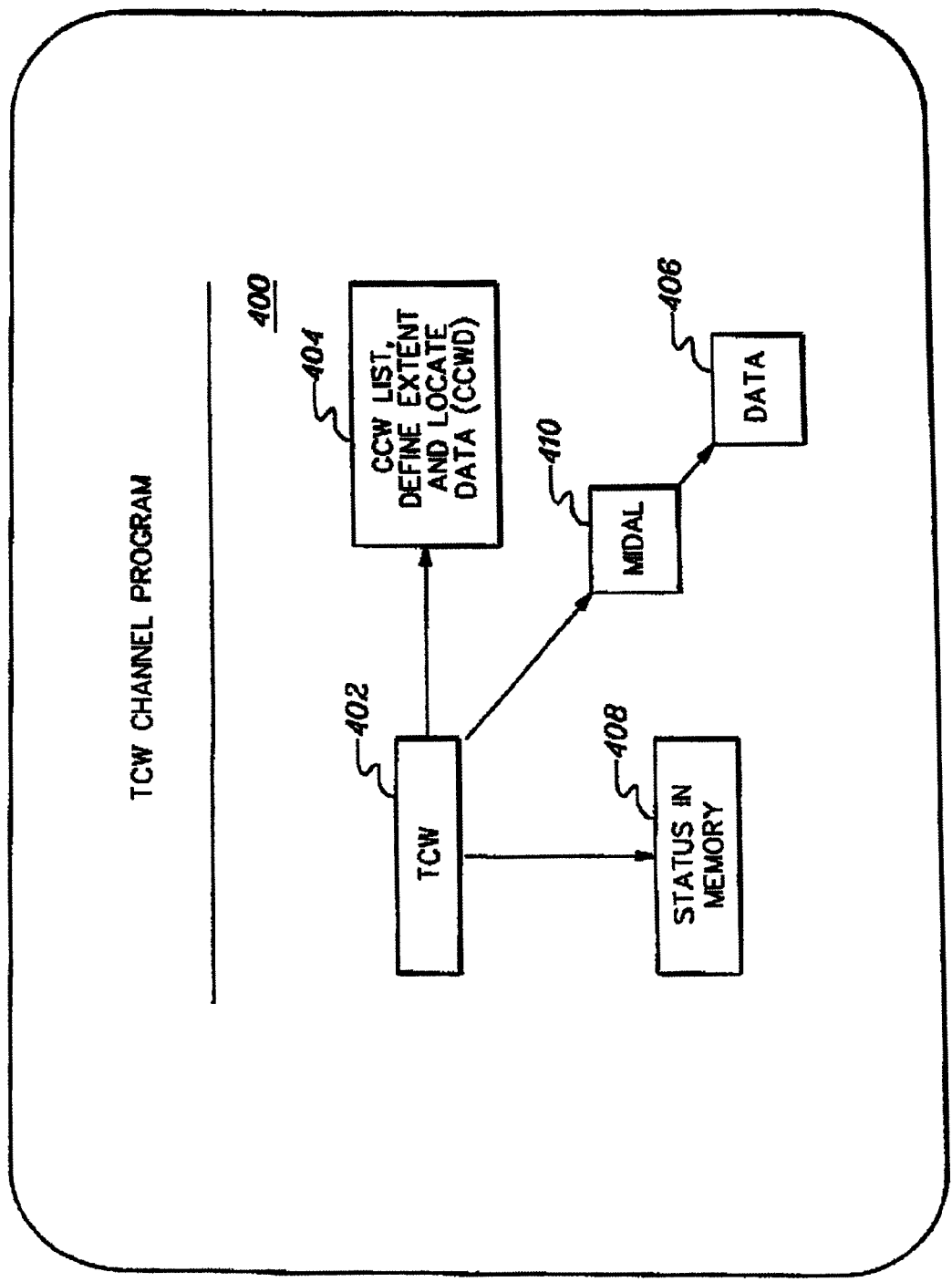
FIG. 4 depicts one embodiment of a transport control word channel program, in accordance with an aspect of the present invention.

By executing the TCW channel program of FIG. 4, there is only one exchange opened and closed (see also FIG. 5), instead of two exchanges for the CCW channel program of FIG. 2b (see also FIG. 3). Further, for the TCW channel program, there are three communication sequences (see FIGS. 4-5), as compared to seven sequences for the CCW channel program (see FIGS. 2b-3).

Figure 6:
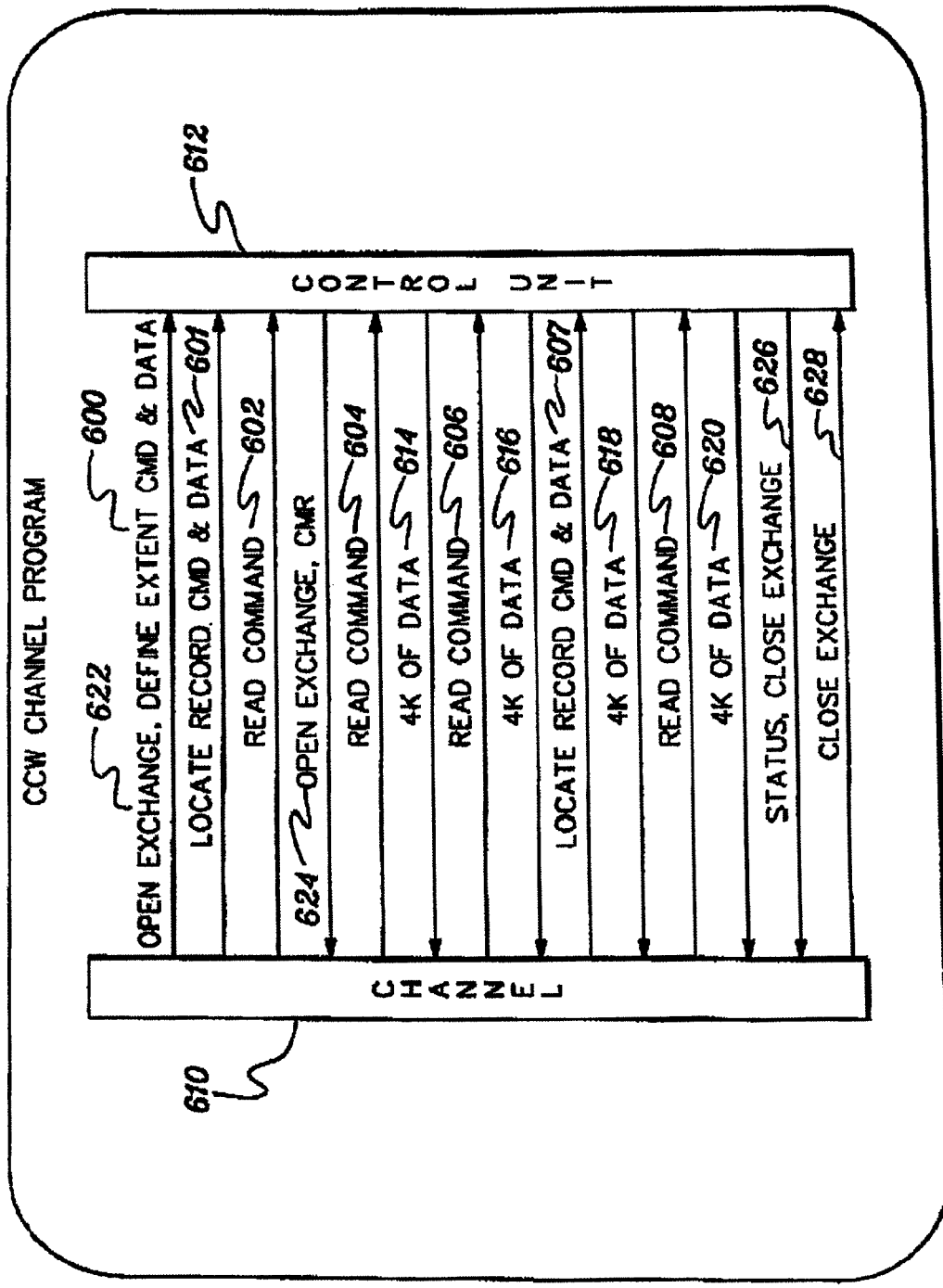
FIG. 6 depicts one embodiment of a link protocol used to communicate between a channel and control unit in order to execute four read commands of a channel command word channel program.

The number of exchanges and sequences remain the same for a TCW channel program, even if additional commands are added to the program. Compare, for example, the communications of the CCW channel program of FIG. 6 with the communications of the TCW channel program of FIG. 7. In the CCW channel program of FIG. 6, each of the commands (e.g., define extent command 600, locate record command 601, read command 602, read command 604, read command 606, locate record command 607 and read command 608) are sent in separate sequences from the channel 610 to the control unit 612. Further, each 4 k block of data (e.g., data 614-620) is sent in separate sequences from control unit 612 to channel 610. This CCW channel program requires two exchanges to be opened and closed (e.g., open exchanges 622, 624 and close exchanges 626, 628), and fourteen communications sequences. This is compared to the three sequences and one exchange for the TCW channel program of FIG. 7, which accomplishes the same task as the CCW channel program of FIG. 6.

Figure 7:
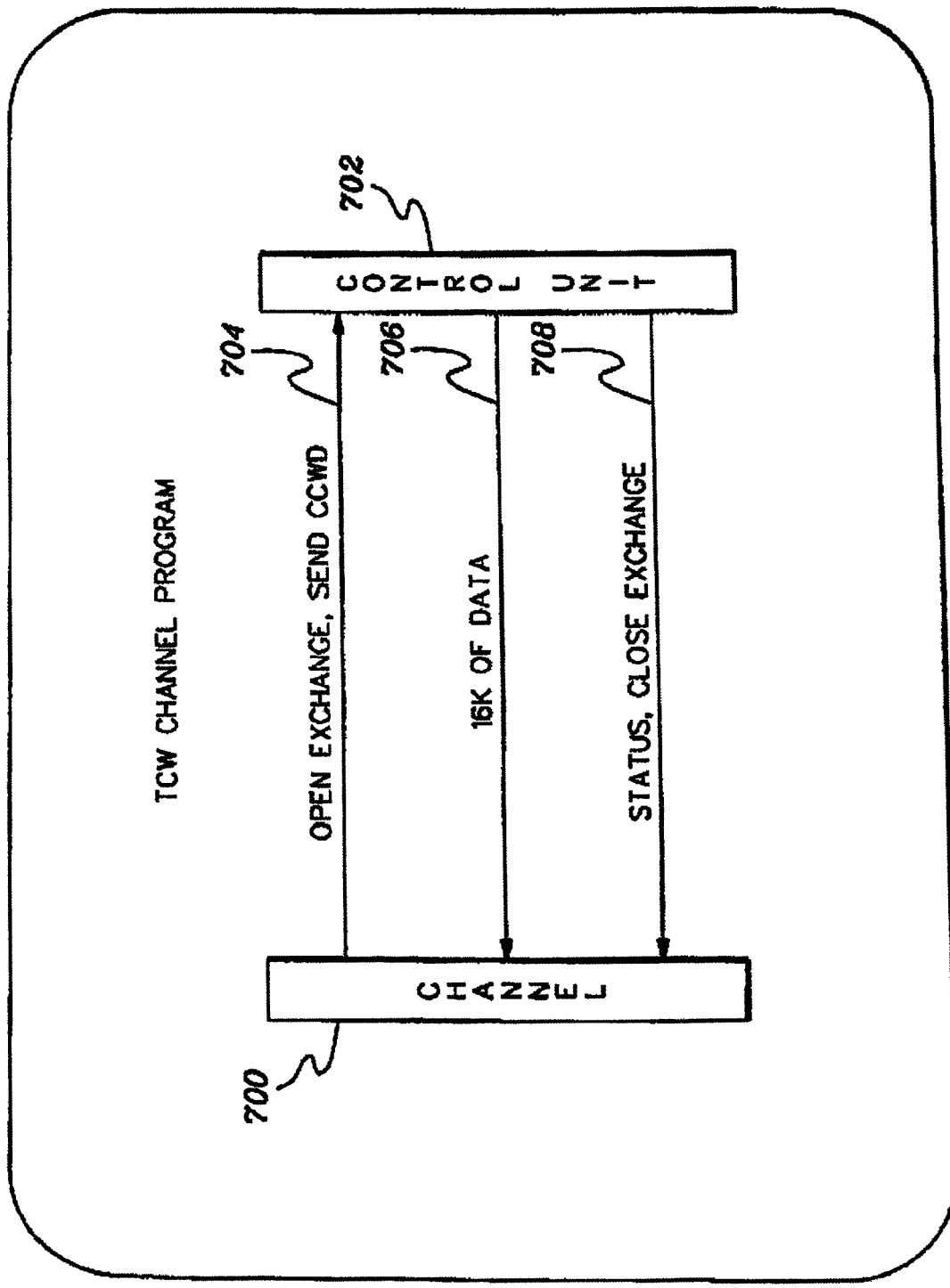
FIG. 7 depicts one embodiment of a link protocol used to communicate between a channel and control unit to process the four read commands of a transport control word channel program, in accordance with an aspect of the present invention.

As depicted in FIG. 7, a channel 700 opens an exchange with a control unit 702 and sends a channel command word descriptor 704 to the control unit. The CCWD includes the define extent command, the two locate record commands, and the four read commands, as described above. In response to receiving the CCWD, the control unit executes the commands and sends, in a single sequence, the 16 k of data 706 to the channel. Additionally, the control unit provides status to the channel and closes the exchange 708. Thus, the TCW channel program requires much less communications to transfer the same amount of data as the CCW channel program.

Further details regarding the transport control word, the channel command word descriptor and status are described with reference to FIGS. 8-10. In particular, one embodiment of a transport control word is described with reference to FIG. 8, one embodiment of a channel command word descriptor referred to by the transport control word is described with reference to FIG. 9, and one embodiment of ending status also referred to by the transport control word is described with reference to FIG. 10.

Figure 8:
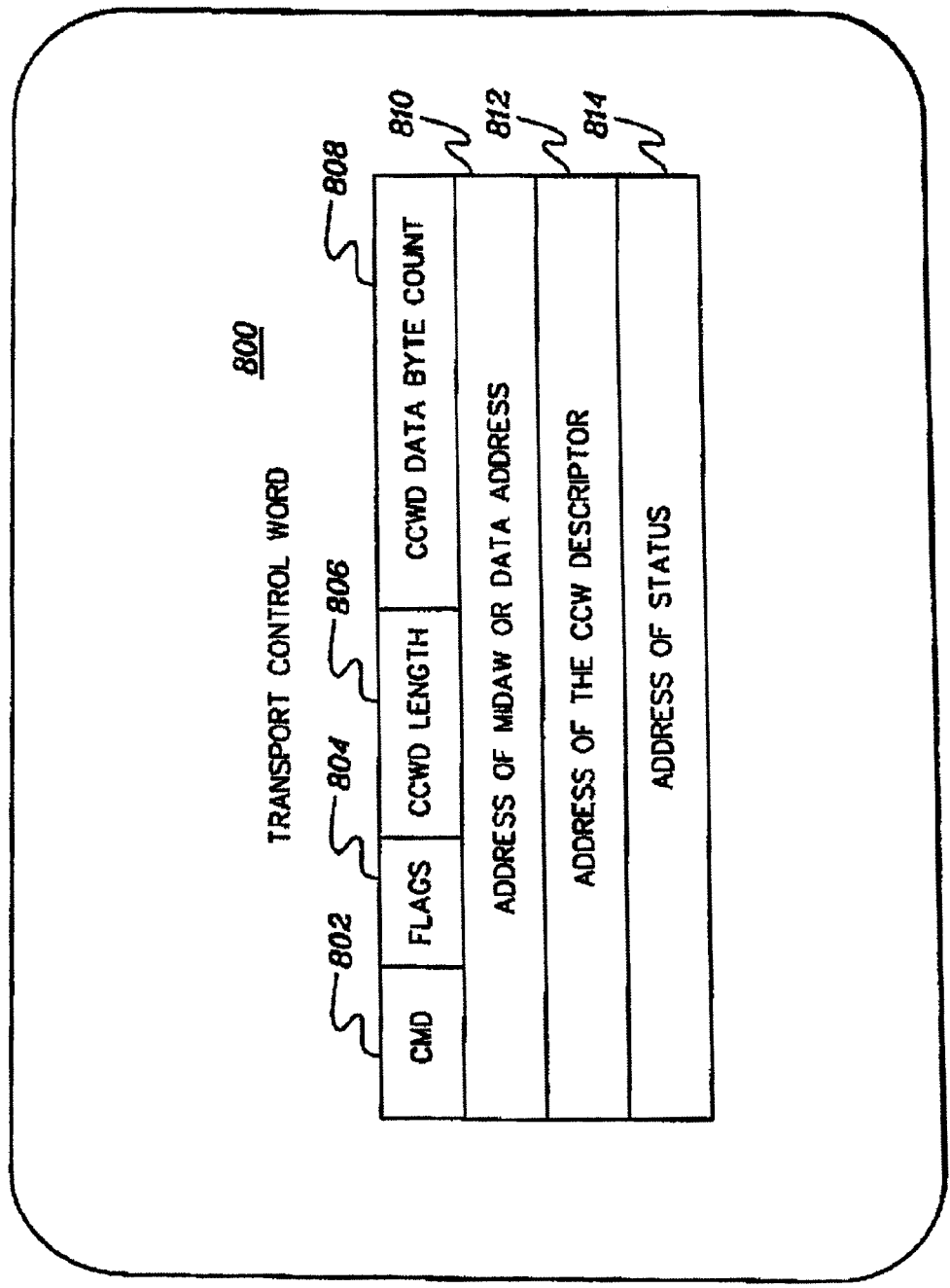
FIG. 8 depicts one embodiment of a transport control word used in accordance with an aspect of the present invention.
Figure 9:
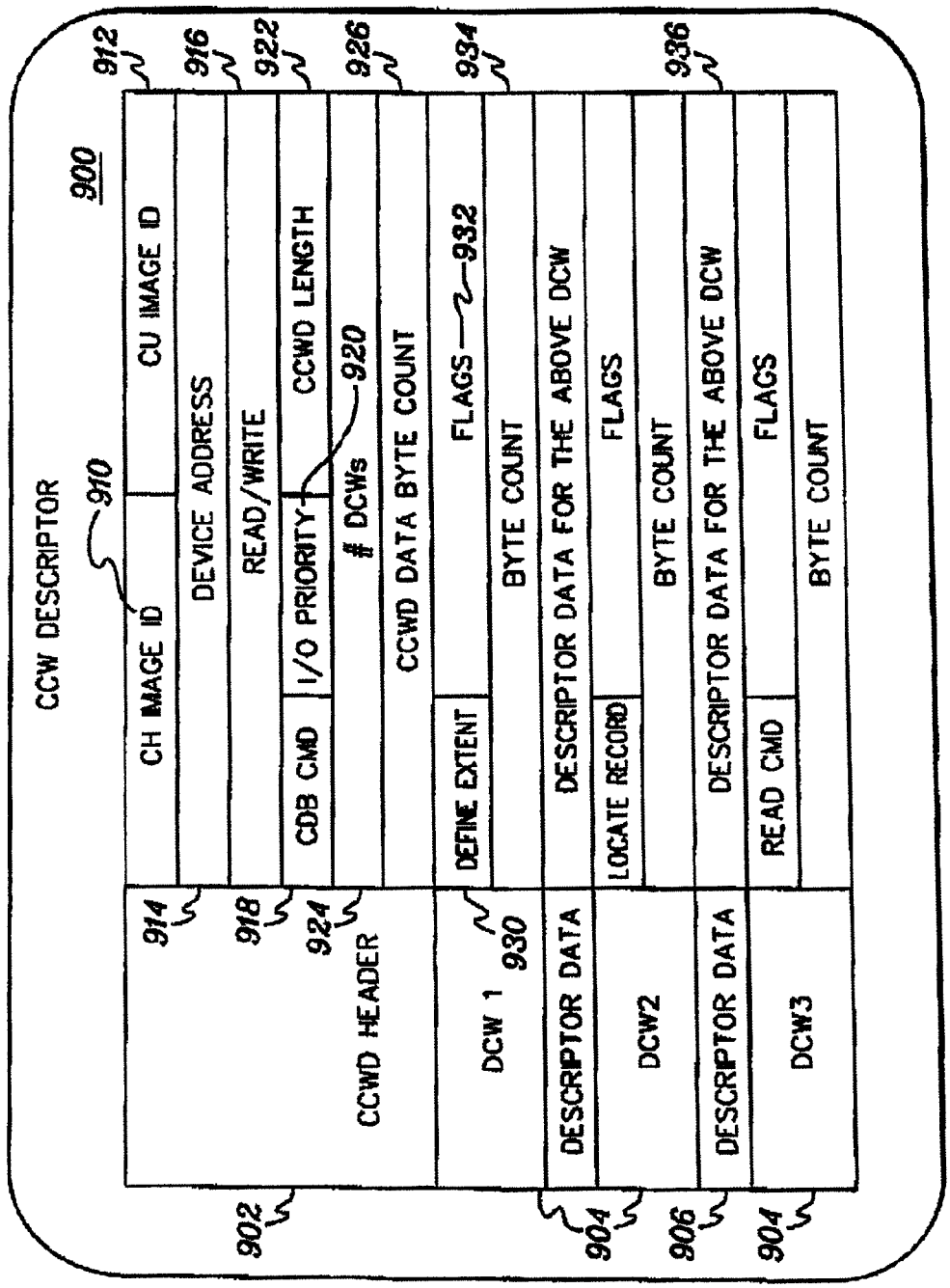
FIG. 9 depicts one embodiment of a channel command word descriptor specified by the transport control word of FIG. 8 and used in accordance with an aspect of the present invention.

Referring to FIG. 8, in one example, a transport control word 800 includes a plurality of fields, such as, for instance:

a) Command Field 802: The command field indicates if the command is a TCW channel command or a legacy channel CCW. A TCW channel command is an X8 command with X not equal to zero. As examples, the X8 command field includes one of the following commands:

1) For x=one, as one example, the command is a write TCW command that transfers a channel command word descriptor to the control unit, as well as customer data, per the channel command word descriptor data byte count field in the transport control word; and 2) For x=two, as one example, the command is a read TCW command that transfers a channel command word descriptor to the control unit, and the channel command word descriptor data byte count is the total amount of data the control unit will transfer to the channel;

b) Flags 804: The flag field may include one or more flags. In this example, it includes a MIDAW flag that indicates whether modified indirect addressing or direct addressing is being used. If the flag is active, an address 810 in the transport control word is the address of a first modified indirect data address word (MIDAW) of a modified indirect data address list (MIDAL). Otherwise, the address is a data address used for direct addressing;

c) CCWD Length 806: This field includes the length of the channel command word descriptor specified by this transport control word;

d) CCWD Data Byte Count 808: This field includes the total amount of customer data to be transferred by all of the descriptor command words (DCWs), described below, in the channel command word descriptor;

e) Address of MIDAW or Data Address 810: This field provides the address of a MIDAW, assuming flag field 804 indicates it should be a MIDAW address, or an address of customer data;

f) Address of the CCWD 812: This field includes an address to locate in memory the channel command word descriptor. The channel command word descriptor is further described below.

g) Address of Status 814: This field includes an address to locate in memory an ending completion status for this transport control word. Further information regarding the ending status is described below.

The three addresses defined by the transport control word including, MIDAW or data address 810, CCWD address 812, and status address 814, are used by, for instance, a host bus adapter to execute the equivalent of a FCP operation. This enables the FCP link phases, instead of FICON phases, to be used in communications, thereby significantly increasing performance and efficiency of the channel subsystem.

As indicated above, the transport control word specifies a channel command word descriptor to be used. The channel command word descriptor includes the multiple commands to be executed by the control unit. The commands are executed independent of the channel in that status relative to execution of the individual commands is not tracked by the channel. The control unit receives the multiple commands as a single unit and has the responsibility of executing the commands, in an appropriate manner. In one example, the CCWD is sent to the control unit as the FCP_CMND IU payload in the FCP link protocol. By relieving the channel of the responsibility of tracking individual commands, performance of the channel is significantly enhanced. Moreover, the control unit benefits by seeing the entire channel program at one time.

One embodiment of a channel command word descriptor (CCWD) is described with reference to FIG. 9. A channel command word descriptor 900 has three main parts, including, for instance, a header 902, multiple DCWs 904 and descriptor data 906, each of which is described below.

CCWD header 902 includes the following fields, as one example:

a) Channel Image Id 910: This field identifies the channel involved in the communication;

b) Control Unit Image Id 912: This field identifies the control unit communicating with the channel identified by channel image id 910;

c) Device Address 914: This field identifies the device coupled to the control unit that is involved in the I/O communications;

d) Read or Write field 916: This field indicates whether the I/O operations are read or write;

e) CDB CMD 918: This field is used to identify this as a CCWD;

f) I/O Priority 920: This field indicates the priority of this I/O;

g) CCWD Length 922: This field indicates the length of the CCWD;

h) # DCWs 924: This field indicates the number of descriptor command words for this CCWD; and i) CCWD Data Byte Count 926: This field describes the total customer data to be transferred by the CCWD.

Each descriptor command word 904 includes a plurality of fields, such as, for instance:

a) Command Field 930: This field includes the CCW command (e.g., control commands like define extent and locate record, read, write, etc.);

b) Flag Field 932: This field may include one or more flags. In this example, flag field 932 includes a command chain flag indicating whether command chaining is present; and a descriptor data present flag indicating whether descriptor data is present in the CCWD following this DCW. This flag is active for write control, when the write control command requires descriptor data;

c) Byte Count Field 934: If this is a control command, the count is the number of bytes of control data in the CCWD; otherwise, it is the count of customer data to be transferred by this DCW. If the DCW command is a command intermediate or a no op command, the byte count field is zero.

Descriptor data 906 includes the data 936 for a DCW write control command. This data is in the CCWD following the DCW the data is for and its presence is made known by the flag field in the DCW. By specifying control data directly in the descriptor list, the device can obtain the data without requiring the device to perform a separate data transfer to obtain it.

In one embodiment, a checking code, such as a cyclic redundancy check (e.g., FICON CRC), a longitudinal redundancy check (LRC), a checksum, etc., is applied across the CCWD data transferred per the sum of the DCW byte counts in the CCWD, and a separate checking code is applied to the CCWD, when it is transmitted to the control unit. For example, a checking code is applied to the total data being transferred by the CCWD. This is at a higher level than the CRC applied at the transport level. The check is applied to each data packet sent, and then accumulated and verified at the receiver end to ensure the entire data, as specified by the CCWD data byte count, arrived completely and without errors.

As a further example, for the CCWD itself, a checking code is applied. For instance, the code is appended to the information. The control unit receives the information, checks the code, and if valid, the information is considered valid.

The transport control word also specifies a location for ending status. This allows the operating system to specify an area in storage for the extra timers and count information from the control unit for a TCW operation and for sense data, thus, guaranteeing the delivery of concurrent sense data on every unit check condition. One example of ending status is described with reference to FIG. 10.

In one embodiment, an ending status control block 1000 includes the following fields:

a) DCW Residual Byte Count 1002: This field indicates the residual byte count of a failed DCW (i.e., where execution of the DCWs was interrupted);

b) Sense Length 1004: This field specifies the length of sense data appended at the end of this control block in appended sense data;

c) Response Length 1006: This field indicates the length of the response portion of this control block;

d) CH Image Id 1008: This field identifies the channel involved in the communication;

e) CU Image Id 1010: This field identifies the control unit communicating with the channel identified by channel image id 1008;

f) Device Address 1012: This field identifies the device coupled to the control unit that is involved in the I/O communications;

g) Status Flags 1014: This field specifies one or more status flags. Examples of status flags are described in "Fibre Channel Single Byte Command Code Sets-2 Mapping Protocol (FC-SB-3), T11/Project 1357-D/Rev. 1.6, INCITS (March 2003), which is hereby incorporated herein by reference in its entirety;

h) Status 1016: This field identifies status of the communication, including, for instance, device status, which is further described in "IBM® z/Architecture Principles of Operation," Publication No. SA22-7832-04, 5th Edition, September 2005, hereby incorporated herein by reference in its entirety;

i) CCWD Residual Byte Count 1020: This field indicates the residual byte count of the CCWD Data Byte Count, which is the remaining count of data that was not transferred for the whole CCWD;

j) DCW Offset 1022: If all DCWs are not executed in the CCWD, this is the DCW offset in the CCWD of the failed DCW;

k) Queue Time Parameter 1024: This field specifies the amount of time the control unit had the I/O operation on it's queue with the exchange open to the channel;

l) Defer Time Parameter 1026: This field specifies the amount of time the control unit waited for the data, with the exchange open to the channel, because of a control unit data cache miss. The control unit had to access the media to reference the requested data;

m) Control Unit Active Time 1028: This field specifies the time the control unit is active executing a TCW;

n) Appended Sense Data, if any 1030: This field includes sense for the case the control unit encountered a unit check during the I/O operation.

Status is further described in "IBM® z/Architecture Principles of Operation," Publication No. SA22-7832-04, 5th Edition, September 2005; and queue time, defer time and appended sense are further described in "Fibre Channel Single Byte Command Code Sets-2 Mapping Protocol (FC-SB-3), T11/Project 1357-D/Rev. 1.6, INCITS (March 2003), each of which is hereby incorporated herein by reference in its entirety.

Figure 11:
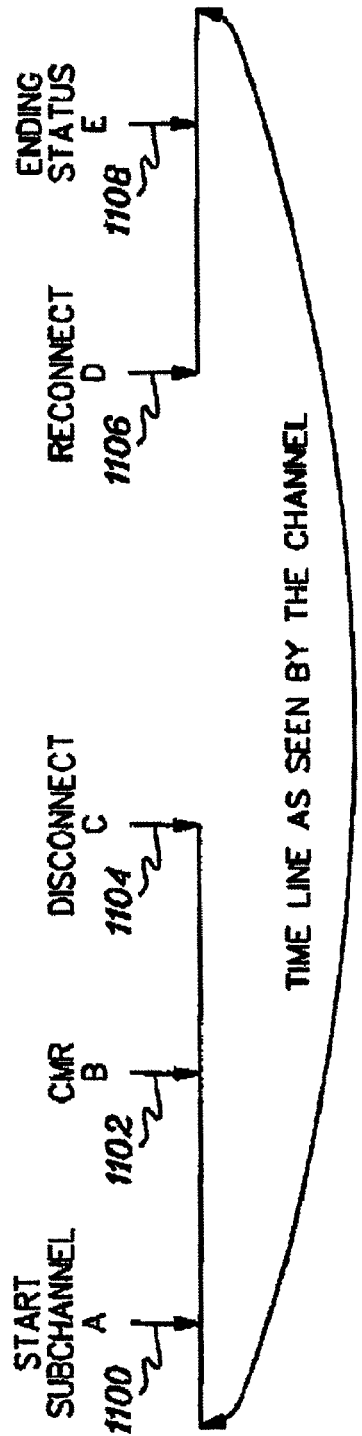
FIG. 11 depicts one embodiment of response information received for a channel command word channel program.

For legacy FICON, the command response is an important measurement point in the operation of a CCW channel program. FIG. 11 is a timeline as seen by the channel that depicts various timing points kept track of by the channel subsystem for a CCW channel program. As an example, the channel sees Start subchannel A 1100, CMR B 1102, Disconnect C 1104, Reconnect D 1106 and Ending Status E 1108. The control unit provides the channel with the CU queue time and CU defer time at ending status time.

The legacy channel subsystem, in effect, performs a number of steps to gather various times for channel subsystem measurements. For example, with reference to FIG. 11, it timestamps the time of start Subchannel at A 1100, and it timestamps the time of CMR at B 1102. At disconnect time C 1104, it calculates connect time (CT=C−B). It timestamps the time of reconnect at D 1106, and timestamps Ending Status time at E 1108. From there, it calculates total connect time CT=(C−B)+(E−D); total start pending time SP=(B−A); and disconnect time DT=(E−A)−CT−SP).

For a TCW, however, the channel does not get a Command Response CMR to know when the control unit started the I/O operation. For instance, with reference to the timeline of FIG. 12, it only sees the Start Subchannel A 1200 and the Ending status E 1202. The channel does not see for a TCW operation the CMR B 1204 time, and the time required to retrieve data from the media starting at C 1206 and ending at D 1208. The time to retrieve data from the media is part of the CU defer time for a TCW. The CU queue time (not shown) and CU defer time are provided by the control unit at ending status time.

Thus, for a TCW channel program, the channel timestamps the time of Start Subchannel at A 1200 and the ending status time at E 1202, but it is the control unit that performs the tracking of when the operation started and the total time to execute the individual commands and provide this measurement data as part of the ending status.

Figure 10:
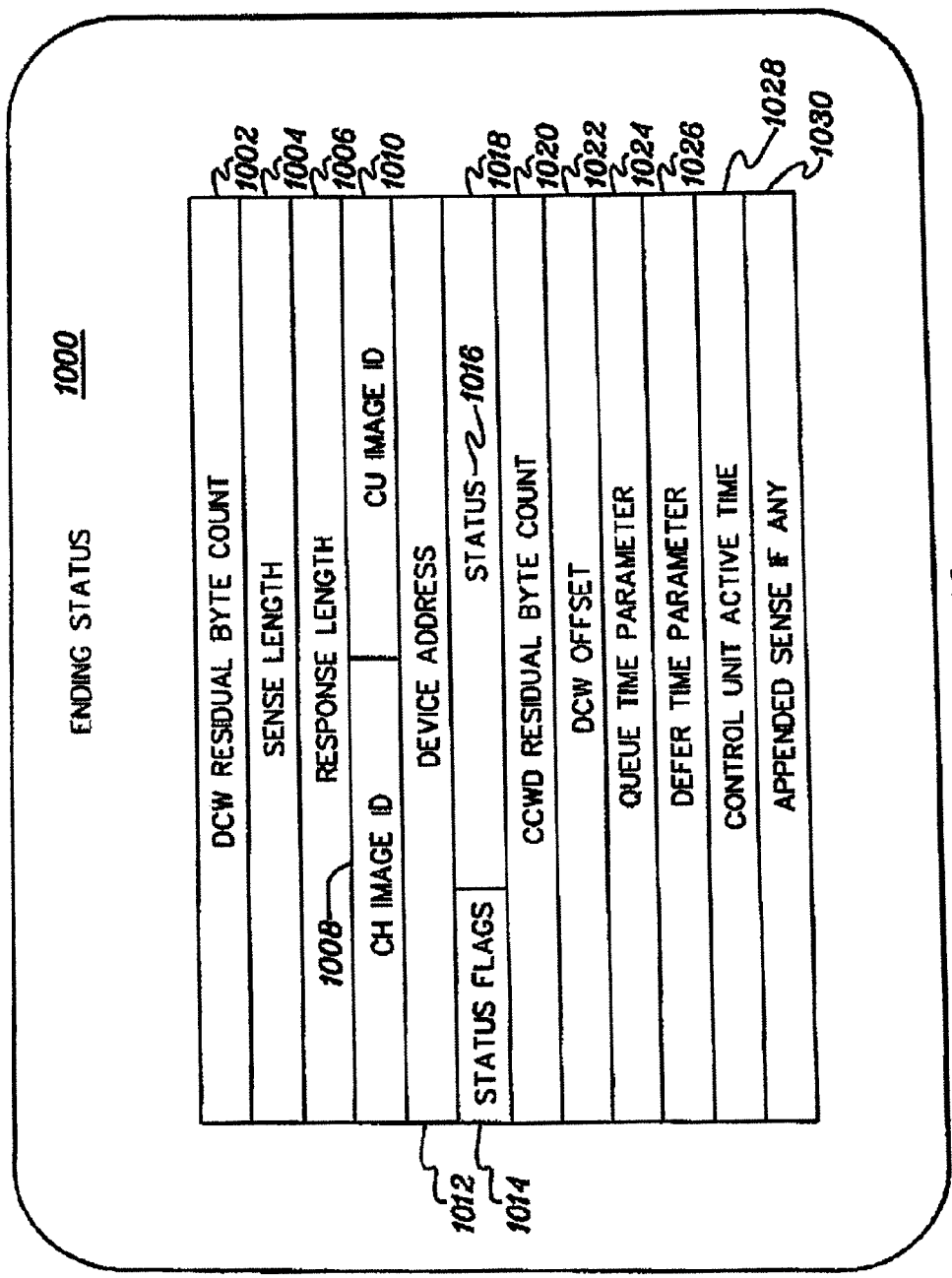
FIG. 10 depicts one embodiment of ending status specified by the transport control word of FIG. 8 and used in accordance with an aspect of the present invention.
Figure 12:
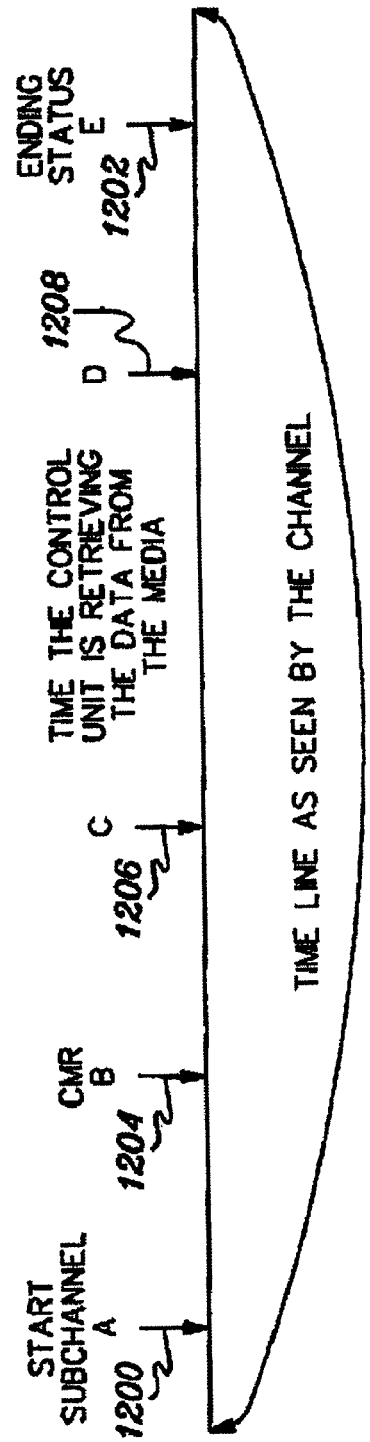
FIG. 12 depicts one embodiment of response information received for a transport control word channel program, in accordance with an aspect of the present invention.

As one example, the control unit reports the following at ending status:

AT=Active time=(C−B)+(E−D) in FIG. 12—this is CU active time 1028 in FIG. 10;

QT=CU queue time—this is the amount of time the control unit had the operation on it's queue before starting the operation and is the queue time parameter 1024 in FIG. 10; and DT=Defer time=(D−C) in FIG. 12—this is defer time parameter 1026 in FIG. 10.

From the timers provided by the control unit and the beginning and ending timestamps provided by the channel subsystem at A and E on FIG. 12, the same measurement data is provided for a TCW command as for the legacy CCW commands. The I/O subsystem determines:

CMR time (B−A (FIG. 12))=(E−A)−AT−DT−QT;

Total connect time CT=CU reported active time AT (1028 in FIG. 10);

Total start pending time SP=(E−A)−AT−DT; and

Disconnect time=CU reported defer time=(D−C) (1026 in FIG. 10).

Therefore, the control unit has the responsibility of tracking state information of the individual commands and providing measurement data relating thereto, relieving the channel of this responsibility. The operating system communicates directly with the control unit using the channel only as a conduit. The channel does not track the state information of the individual commands but the I/O subsystem provides the same measurement data as with legacy CCWs by using the I/O subsystem timestamps A and E and the three timers from the control unit, and thus, the same measurement data is provided to the operating system. At the same time, the workload of the channel is reduced.

One or more aspects of the present invention can be included in an article of manufacture (e.g., one or more computer program products) having, for instance, computer useable media. The media has therein, for instance, computer readable program code means or logic (e.g., instructions, code, commands, etc.) to provide and facilitate the capabilities of the present invention. The article of manufacture can be included as a part of a computer system or sold separately.

Figure 13:
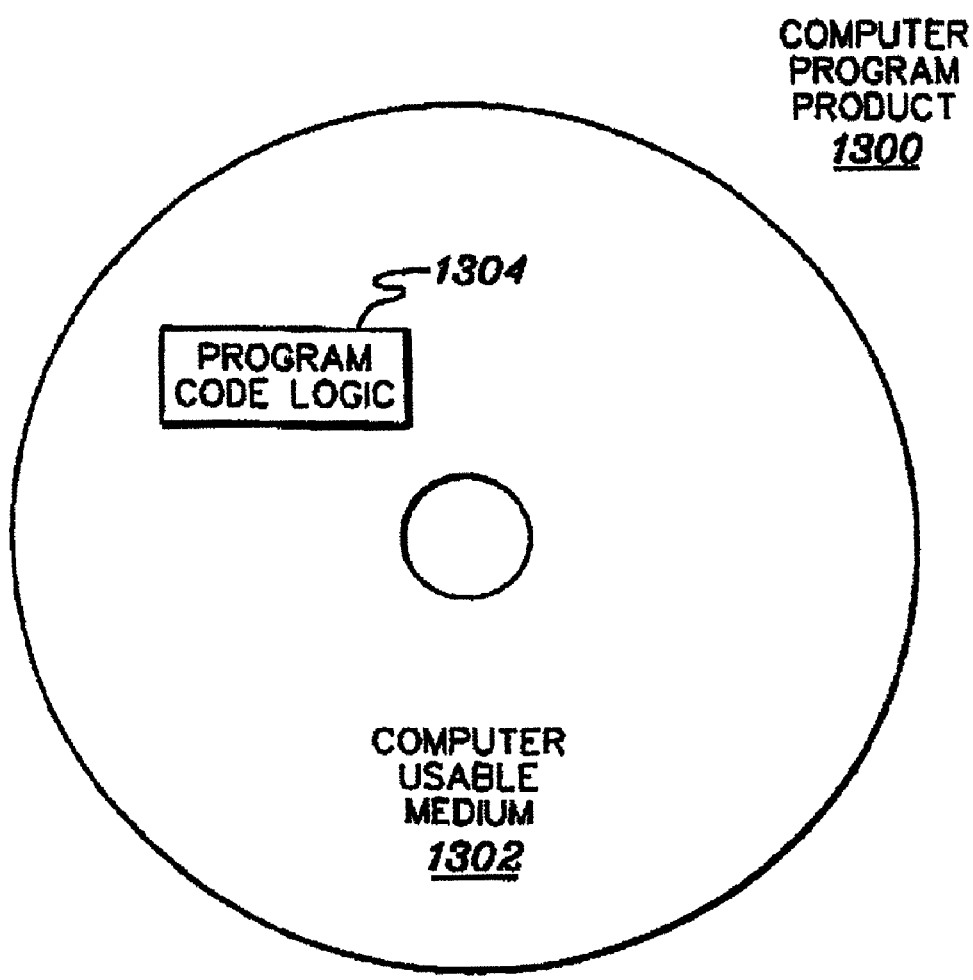
FIG. 13 depicts one embodiment of a computer program product incorporating one or more aspects of the present invention.

One example of an article of manufacture or a computer program product incorporating one or more aspects of the present invention is described with reference to FIG. 13. A computer program product 1300 includes, for instance, one or more computer usable media 1302 to store computer readable program code means or logic 1304 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, in accordance with one or more aspects of the present invention, I/O processing is enhanced by enabling the operating system to communicate directly with the control units and by relieving the I/O communications adapters of having to track all the state information regarding individual commands being processed. That is, a direct communication path is established between an operating system and a control unit, such that the operating system can deliver a list of command words to the device through the channel subsystem without the channel subsystem requiring any visibility to or processing of the individual commands. This reduces the work of the communications adapter, and enhances the performance thereof. Further, the control unit is benefited by having an understanding of all the commands to be performed by the control unit for a channel program. Additionally, more precise measurement data is provided by having the control unit provide the various times for intervals it controls directly, rather than having the channel subsystem infer the times from imprecise signals on the interface.

In accordance with one or more aspects of the present invention, well behaved (e.g., predictable execution known by the operating system or software at build time) CCW chains are collapsed into one control block referred to herein as the CCW Descriptor (CCWD) and is referenced by a CCW referred to herein as the transport control word. Command chain CCWs, as well as data chain CCWs, may be collapsed into one CCWD. This reduces the number of sequences and exchanges required to transfer a given amount of data. Instead of requiring separate sequences for individual device commands, a single exchange is used. As one example, this results in a 2× reduction over FICON in both exchanges and sequences required to transfer 4 k of data. This enables FICON to be competitive with FCP particularly on small block transfers. Instead of using the FICON link phases, FCP link phases are used. However, the information that is in the FCP_CMND IU and FCP_RSP IU is not FCP, except for bits and bytes that have to be sent in the FCP_CMND IU to allow a FCP host bus adapter to work with the protocol.

The TCW provides the information for an I/O communications adapter to transport the list of CCW commands to the control unit, as well as transfers customer data to or from the control unit. Advantageously, a channel subsystem using one or more aspects of the present invention can also continue to use CCW channel programs, as well as the TCW channel programs. By using TCWs, the performance of an I/O operation that transfers, for instance, small blocks of data is improved. Moreover, the use of TCWs and CCWDs enables a place for sense data, which may be sent with the ending status.

Although various embodiments are described above, these are only examples. Processing environments other than those described herein, including others that use I/O subsystems, other than channel subsystems, can incorporate and use one or more aspects of the present invention. Further, although various control blocks have been shown, the location of the information within those control blocks may be other than shown herein. Further, each control block may include additional, less or different information than described herein. For instance, there may be additional, fewer and/or different fields, including fields that may include additional, fewer and/or different flags. Further, there may be additional, fewer and/or different field sizes. Yet further, although main memory is mentioned or described in various portions of the embodiment, one or more aspects of the present invention may be applicable to other memory. Still further, although communications protocols, such as FICON and FCP, are described herein, one or more aspects of the present invention are applicable to other protocols.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In yet other examples, TCW channel programs performing other commands may include one or more aspects of the present invention. Further, TCW channel programs can read other amounts of data than described herein and still benefit from one or more aspects of the present invention. Numerous other examples and modifications are possible without departing from the spirit of the present invention.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although preferred embodiments have been depicted and described in detail there, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer program product for facilitating input/output processing of a processing environment, the computer program product comprising:
   a tangible non-transitory storage medium readable by a processing circuit and storing instructions for execution by the processing circuit for performing a method comprising:
   obtaining by an input/output communications adapter of the processing environment a transport control word, the transport control word including a count of the total amount of data being transferred, an address of a channel command word descriptor to be sent to a control unit of the processing environment, in which the channel command word descriptor is configured to contain a plurality of commands to be executed by the control unit, an address that informs the input/output communications adapter where to store or fetch data received from or transmitted to the control unit, and an address of a location to store ending status received from the control unit;
   forwarding from the input/output communications adapter to the control unit the channel command word descriptor that includes one or more commands as one entity, wherein the forwarding includes forwarding from the input/output communications adapter to the control unit the channel command word descriptor including the one or more commands in a single communication; and
   receiving the ending status by the input/output communications adapter absent a tracking of state of individual commands by the input/output communications adapter, the ending status comprising timing information associated with the one or more commands.

2. The computer program product of claim 1, wherein the timing information includes at least one of a control unit active time, a queue time and a defer time.

3. The computer program product of claim 2, wherein the control unit active time specifies an amount of time during which the control unit was actively executing the one or more commands.

4. The computer program product of claim 2, wherein the queue time indicates an amount of time during which the control unit had an I/O operation associated with the one or more commands on a queue.

5. The computer program product of claim 2, wherein the defer time indicates an amount of time during which the control unit was waiting for the data to be transferred.

6. The computer program product of claim 1, wherein the channel command word descriptor is forwarded via a Fibre Channel Protocol command information unit, and the ending status and the timing information is received via a Fibre Channel Protocol response information unit.

7. The computer program product of claim 1, wherein the channel command word descriptor includes a plurality of commands as one entity.

8. An apparatus for facilitating input/output processing of a processing environment, the apparatus comprising:
   an input/output communications adapter of the processing environment configured to communicate with a control unit of the processing environment, the control unit configured to operate and control one or more I/O devices, the input/output communications adapter configured to perform a method comprising:
   obtaining by the input/output communications adapter a transport control word, the transport control word including a count of the total amount of data being transferred, an address of a channel command word descriptor to be sent to the control unit, in which the channel command word descriptor is configured to contain a plurality of commands to be executed by the control unit, an address that informs the input/output communications adapter where to store or fetch data received from or transmitted to the control unit, and an address of a location to store ending status received from the control unit;
   forwarding from the input/output communications adapter to the control unit the channel command word descriptor that includes one or more commands as one entity, wherein the forwarding includes forwarding from the input/output communications adapter to the control unit the channel command word descriptor including the one or more commands in a single communication; and
   receiving the ending status by the input/output communications adapter absent a tracking of state of individual commands by the input/output communications adapter, the ending status comprising timing information associated with the one or more commands.

9. The apparatus of claim 8, wherein the timing information includes at least one of a control unit active time, a queue time and a defer time.

10. The apparatus of claim 9, wherein the control unit active time specifies an amount of time during which the control unit was actively executing the one or more commands.

11. The apparatus of claim 9, wherein the queue time indicates an amount of time during which the control unit had an I/O operation associated with the one or more commands on a queue.

12. The apparatus of claim 9, wherein the defer time indicates an amount of time during which the control unit was waiting for the data to be transferred.

13. The apparatus of claim 8, wherein the channel command word descriptor is forwarded via a Fibre Channel Protocol command information unit, and the ending status and the timing information is received via a Fibre Channel Protocol response information unit.

14. The apparatus of claim 8, wherein the channel command word descriptor includes a plurality of commands as one entity.

15. A method of facilitating input/output processing of a processing environment, the method comprising:
    obtaining by an input/output communications adapter of the processing environment a transport control word, the transport control word including a count of the total amount of data being transferred, an address of a channel command word descriptor to be sent to a control unit of the processing environment, in which the channel command word descriptor is configured to contain a plurality of commands to be executed by the control unit, an address that informs the input/output communications adapter where to store or fetch data received from or transmitted to the control unit, and an address of a location to store ending status received from the control unit;
    forwarding from the input/output communications adapter to the control unit the channel command word descriptor that includes one or more commands as one entity, wherein the forwarding includes forwarding from the input/output communications adapter to the control unit the channel command word descriptor including the one or more commands in a single communication; and
    receiving the ending status by the input/output communications adapter absent a tracking of state of individual commands by the input/output communications adapter, the ending status comprising timing information associated with the one or more commands.

16. The method of claim 15, wherein the timing information includes at least one of a control unit active time, a queue time and a defer time.

17. The method of claim 16, wherein the control unit active time specifies an amount of time during which the control unit was actively executing the one or more commands.

18. The method of claim 16, wherein the queue time indicates an amount of time during which the control unit had an I/O operation associated with the one or more commands on a queue.

19. The method of claim 16, wherein the defer time indicates an amount of time during which the control unit was waiting for the data to be transferred.

20. The method of claim 15, wherein the channel command word descriptor is forwarded via a Fibre Channel Protocol command information unit, and the ending status and the timing information is received via a Fibre Channel Protocol response information unit.

21. The method of claim 15, wherein the channel command word descriptor includes a plurality of commands as one entity.

* * * * *